(12) United States Patent
Sakai et al.

(10) Patent No.: US 11,016,446 B2
(45) Date of Patent: May 25, 2021

(54) TIMEPIECE AND MOTOR CONTROL METHOD

(71) Applicant: Seiko Instruments Inc., Chiba (JP)

(72) Inventors: Satoshi Sakai, Chiba (JP); Tetsuya Nobe, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 0 days.

(21) Appl. No.: 16/752,897

(22) Filed: Jan. 27, 2020

(65) Prior Publication Data

US 2020/0249630 A1  Aug. 6, 2020

(30) Foreign Application Priority Data

Feb. 6, 2019 (JP) .............................. JP2019-019982

(51) Int. Cl.
| | |
|---|---|
| *H02P 8/00* | (2006.01) |
| *G04C 3/14* | (2006.01) |
| *H02P 8/18* | (2006.01) |
| *H02P 8/02* | (2006.01) |

(52) U.S. Cl.
CPC ................. *G04C 3/14* (2013.01); *H02P 8/02* (2013.01); *H02P 8/18* (2013.01)

(58) Field of Classification Search
CPC .................................. G04C 3/14; H02P 8/02
USPC ........................................................ 318/696
See application file for complete search history.

(56) References Cited

U.S. PATENT DOCUMENTS

| | | | | |
|---|---|---|---|---|
| 6,108,279 A | * | 8/2000 | Hara ...................... | G04C 3/143 318/696 |
| 6,163,126 A | * | 12/2000 | Kojima .................... | G04C 3/14 318/685 |
| 2019/0041804 A1 | * | 2/2019 | Takyoh .................. | G04C 13/11 |

FOREIGN PATENT DOCUMENTS

| | | |
|---|---|---|
| JP | S 57-156662 A | 9/1982 |
| JP | S 58-190271 A | 11/1983 |

* cited by examiner

*Primary Examiner* — Erick D Glass
(74) *Attorney, Agent, or Firm* — Brinks Gilson & Lione

(57) ABSTRACT

A timepiece includes a stepping motor having a rotor and a coil, and a drive circuit that applies a first drive pulse having a stable stationary position at a rotor rotation angle of 90 degrees or less from a reference position and a second drive pulse having the stable stationary position at a rotor rotation angle of 90 degrees or more from the reference position, as a pulse for driving the rotor, to the coil. When a period during which the pulse is not applied to the coil is assumed as a waiting period, the drive circuit generates the waiting period after a first application of the second drive pulse after an application of the pulse to the coil is started and rotates the rotor by one or more turns without passing through the waiting period at at least one predetermined timing after the waiting period.

5 Claims, 17 Drawing Sheets

|  |  | 45 | 90 | 135 | 180 | 225 | 270 | 315 | 0 |
|---|---|---|---|---|---|---|---|---|---|
| SECOND COIL 50B | Out1 | H | H | L | L | L | L | L | H |
|  | Out2 | L | L | L | H | H | H | L | L |
| FIRST COIL 50A | Out3 | L | H | H | H | L | L | L | L |
|  | Out4 | L | L | L | L | L | H | H | H |
| FIRST MAGNETIC POLE PORTION 20A | | S | S | S | S | N | N | N | N |
| SECOND MAGNETIC POLE PORTION 20B | | N | N | N | S | S | S | S | N |
| THIRD MAGNETIC POLE PORTION 20C | | S |  | N | N | N |  | S | S |

| ROTOR ROTATION ANGLE | NON-EXCITATION | 1A | 1B |
|---|---|---|---|
| 0 → 45 DEGREES | NEGATIVE | POSITIVE | POSITIVE |
| 45 → 90 DEGREES | NEGATIVE | NEGATIVE | POSITIVE |
| 90 → 135 DEGREES | POSITIVE | NEGATIVE | POSITIVE |
| 135 → 180 DEGREES | POSITIVE | NEGATIVE | NEGATIVE |

TIMEPIECE AND MOTOR CONTROL METHOD

RELATED APPLICATIONS

This application claims priority to Japanese Patent Application No. 2019-019982 filed on Feb. 6, 2019, the entire content of which is incorporated herein by reference.

BACKGROUND OF THE INVENTION

1. Field of the Invention

Embodiments of the present disclosure relate to a timepiece and a motor control method.

2. Description of the Related Art

There is an analog electronic timepiece that is an electronic timepiece provided with a stepping motor including two coils, a stator, and a rotor magnetized in two poles, and capable of moving a pointer such as an hour hand, a minute hand, and a second hand in a forward rotation direction and a reverse rotation direction. In such an analog electronic timepiece, the rotor starts to rotate when a pulse is applied to the coils.

In such an analog electronic timepiece, there is one in which a pulse interval, which is the time from when a pulse is applied until the next pulse is applied, is the time from when the rotor starts to rotate until the rotor reaches a stable stationary position (waiting time) (JP-B-2-58856). By applying such a pulse, the rotor can rotate stably in the forward rotation direction and the reverse rotation direction. However, since the pulse interval needs to be equal to or longer than the time from when the rotor starts to rotate until the rotor reaches the stable stationary position, such an analog electronic timepiece has a problem that speeding up is difficult.

As an analog electronic timepiece that solves the problem of such speeding up, there is an analog electronic timepiece that rotates the rotor in the forward and reverse directions at high speed by using two-phase excitation pulses and shortening the pulse interval (JP-B-2-16679). However, in a case where a pulse having a reverse polarity is applied to the coil, when the pulse interval is short, a reversal operation, which is a phenomenon of continuing to rotate in the direction reverse to a desired rotation direction, may occur in some cases.

In view of the circumstances described above, an object of an embodiment of the present disclosure is to provide a timepiece and a motor control method capable of speeding up hand movement while suppressing an occurrence of a reversal operation.

SUMMARY OF THE INVENTION

According to an aspect of the present disclosure, there is provided a timepiece including a stepping motor in which a rotor magnetized in two poles is rotationally driven in a stator connected to a driving coil, a drive circuit that applies a first drive pulse having a stable stationary position at a rotor rotation angle of 90 degrees or less from a reference position and a second drive pulse having the stable stationary position at a rotor rotation angle of 90 degrees or more from the reference position, as a drive pulse that is a pulse for driving the rotor, to the driving coil, and a control circuit that controls application of the drive pulse by the drive circuit, in which when a period during which the drive pulse is not applied to the driving coil is assumed as a waiting period, the drive circuit generates the waiting period after a first application of the second drive pulse after an application of the drive pulse to the driving coil is started, and rotates the rotor by one or more turns without passing through the waiting period at at least one predetermined timing that is determined in advance after the waiting period.

In the timepiece according to the aspect of the present disclosure, when a process in which the drive circuit continuously applies the second drive pulse to the driving coil after the drive circuit applies the first drive pulse to the driving coil is assumed as one unit process, the drive circuit may apply the drive pulse to the driving coil so as to generate the waiting period every N (N is an integer of 2 or more) unit processes.

In the timepiece according to the aspect of the present disclosure, the drive circuit may apply the drive pulse to the driving coil so as to rotate the rotor by one or more turns without passing through the waiting period at at least one application timing and applies the drive pulse to the driving coil so that the waiting period is randomly generated in a period other than the application timing.

In the timepiece according to the aspect of the present disclosure, the waiting period may be 0.5 ms or more and 2 ms or less.

According to another aspect of the present disclosure, there is provided a motor control method performed by a motor drive device, which includes a stepping motor in which a rotor magnetized in two poles is rotationally driven in a stator connected to a driving coil, a drive circuit that applies a first drive pulse having a stable stationary position at a rotor rotation angle of 90 degrees or less from a reference position and a second drive pulse having the stable stationary position at a rotor rotation angle of 90 degrees or more from the reference position, as a drive pulse that is a pulse for driving the rotor, to the driving coil, and a control circuit that controls application of the drive pulse by the drive circuit, the motor control method including a control step of, when a period during which the drive pulse is not applied to the driving coil is assumed as a waiting period, controlling the drive circuit to generate the waiting period after a first application of the second drive pulse after an application of the drive pulse to the driving coil is started, and rotate the rotor by one or more turns without passing through the waiting period at at least one predetermined timing that is determined in advance after the waiting period.

DETAILED DESCRIPTION OF THE PREFERRED EMBODIMENTS

Figure 1:
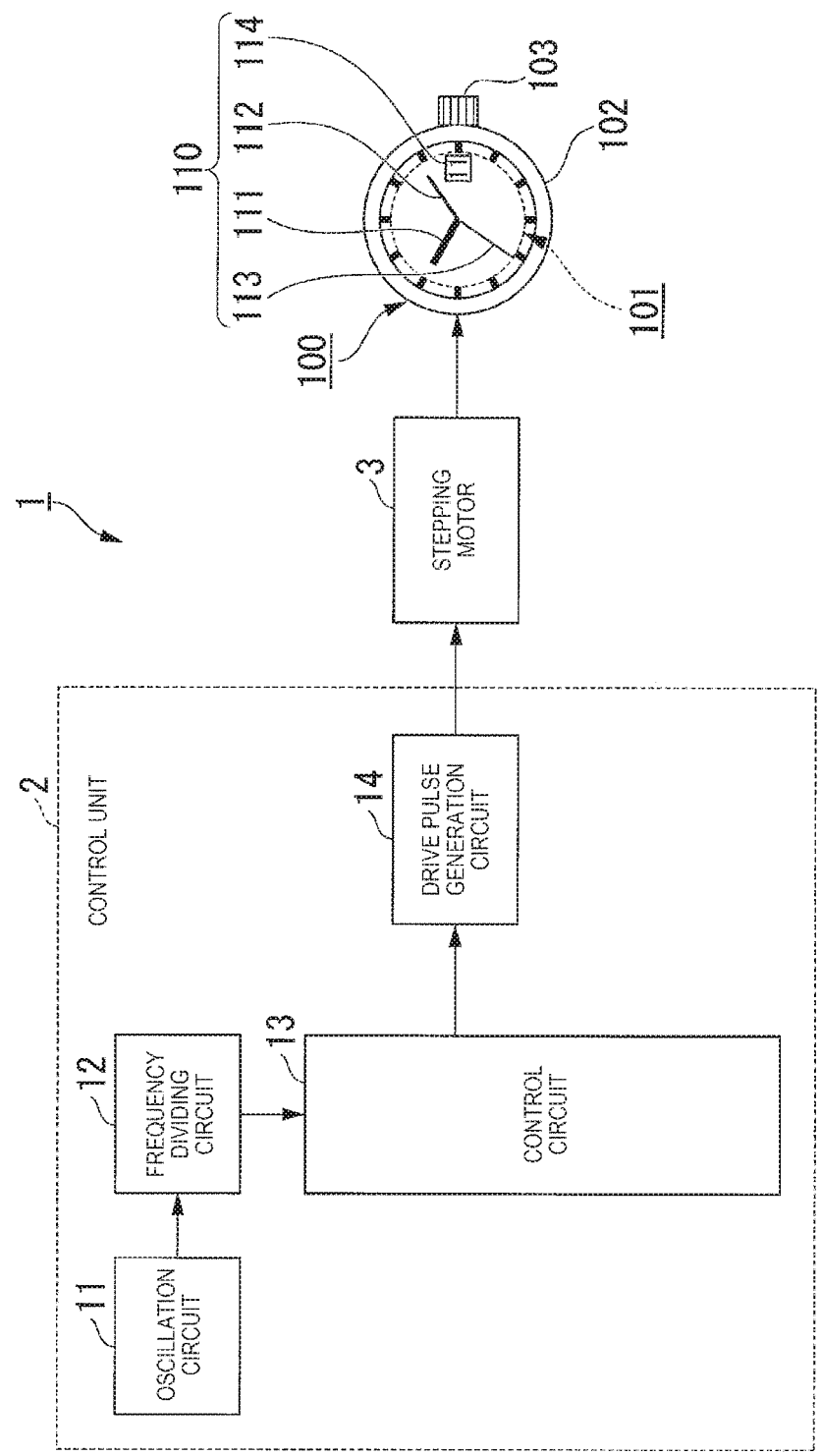
FIG. 1 is a block diagram illustrating an example of a functional configuration of an analog electronic timepiece according to a first embodiment.

Hereinafter, embodiments of the present disclosure will be described with reference to the drawings. In the drawings used for the following description, the scale of each member is appropriately changed in order to make each member a recognizable size.

First Embodiment

Configuration Example of Analog Electronic Timepiece 1

FIG. 1 is a block diagram illustrating an example of a functional configuration of the analog electronic timepiece 1 according to a first embodiment.

The analog electronic timepiece 1 operates in any one of a normal hand movement mode, a fast-forwarding forward rotation hand movement mode, and a fast-forwarding reverse rotation hand movement mode. The normal hand movement mode is an operation mode for displaying the current time. The fast-forwarding forward rotation hand movement mode is an operation mode in which a pointer is rotated forward at a speed faster than the speed of the hand movement in the normal hand movement mode. The fast-forwarding forward rotation hand movement mode is, for example, an operation mode for adjusting time. The fast-forwarding reverse rotation hand movement mode is an operation mode in which the pointer is rotated backward at a speed higher than the speed of the movement in the normal hand movement mode. The operation mode of the analog electronic timepiece 1 can be selected by the user.

Hereinafter, when the fast-forwarding forward rotation hand movement mode and the fast-forwarding reverse rotation hand movement mode are not distinguished, these modes are referred to as a fast-forwarding forward rotation hand movement mode.

The analog electronic timepiece 1 includes a control unit 2, the stepping motor 3, an analog display unit 100, a timepiece movement 101, a timepiece case 102, and a crown 103.

The control unit 2 includes an oscillation circuit 11, a frequency dividing circuit 12, a control circuit 13, and a drive pulse generation circuit 14.

The analog display unit 100 includes an hour hand 111, a minute hand 112, a second hand 113, and a calendar display unit 114 for date display. In the following description, when one of the hour hand 111, the minute hand 112, the second hand 113, and the date display calendar display unit 114 is not specified, these are referred to as a pointer 110.

On the outer surface side of the timepiece case 102, an analog display unit 100 is arranged. The timepiece movement 101 including a train wheel (not illustrated) is arranged inside the timepiece case 102.

The crown 103 is operated, for example, when the operation mode is selected, in a case of executing fast-forwarding start when the fast-forwarding forward rotation hand movement mode, or the like is selected. The crown 103 is an input component, such as a start/stop button and a reset button, that receives user operations. The crown 103 outputs an operation signal corresponding to the operation to the control unit 2 when operated (for example, a pressing operation or a rotation operation) by the user. The operation signal is, for example, an operation signal indicating a fast-forwarding forward rotation hand movement mode. The operation signal is, for example, an operation signal indicating a fast-forwarding reverse rotation hand movement mode. The user can select the operation mode of the analog electronic timepiece 1 by operating the crown 103.

The oscillation circuit 11 generates a signal having a predetermined frequency.

The frequency dividing circuit 12 divides the signal generated by the oscillation circuit 11 to generate a timepiece signal used as reference for timing.

The control circuit 13 controls each electronic circuit element constituting the analog electronic timepiece 1 and controls a pulse signal for motor rotation drive.

When the control circuit 13 obtains the operation signal indicating the fast-forwarding forward rotation hand movement mode, the control circuit 13 transmits a control signal to the drive pulse generation circuit 14 so that the analog electronic timepiece 1 is driven in the fast-forwarding forward rotation hand movement mode. When the control circuit 13 acquires the operation signal indicating the fast-forwarding reverse rotation hand movement mode, the control circuit 13 transmits the control signal to the drive pulse generation circuit 14 so that the analog electronic timepiece 1 is driven in the fast-forwarding reverse rotation hand movement mode.

The drive pulse generation circuit 14 generates a drive pulse for motor rotation drive based on the control signal output from the control circuit 13, and outputs the generated drive pulse to the stepping motor 3.

The stepping motor 3 is rotationally driven by an applied drive pulse. As the stepping motor 3 rotates, the pointer 110 is moved through the train wheel.

The stepping motor 3 is a two-phase stepping motor. The stepping motor 3 is configured to include a stator 20, a first yoke 22, a pair of second yokes 23 and 24, a rotor 30, a first coil 50A, and a second coil 50B.

Configuration Example of Stepping Motor 3

Next, a configuration example of the stepping motor 3 will be described.

Figure 2:
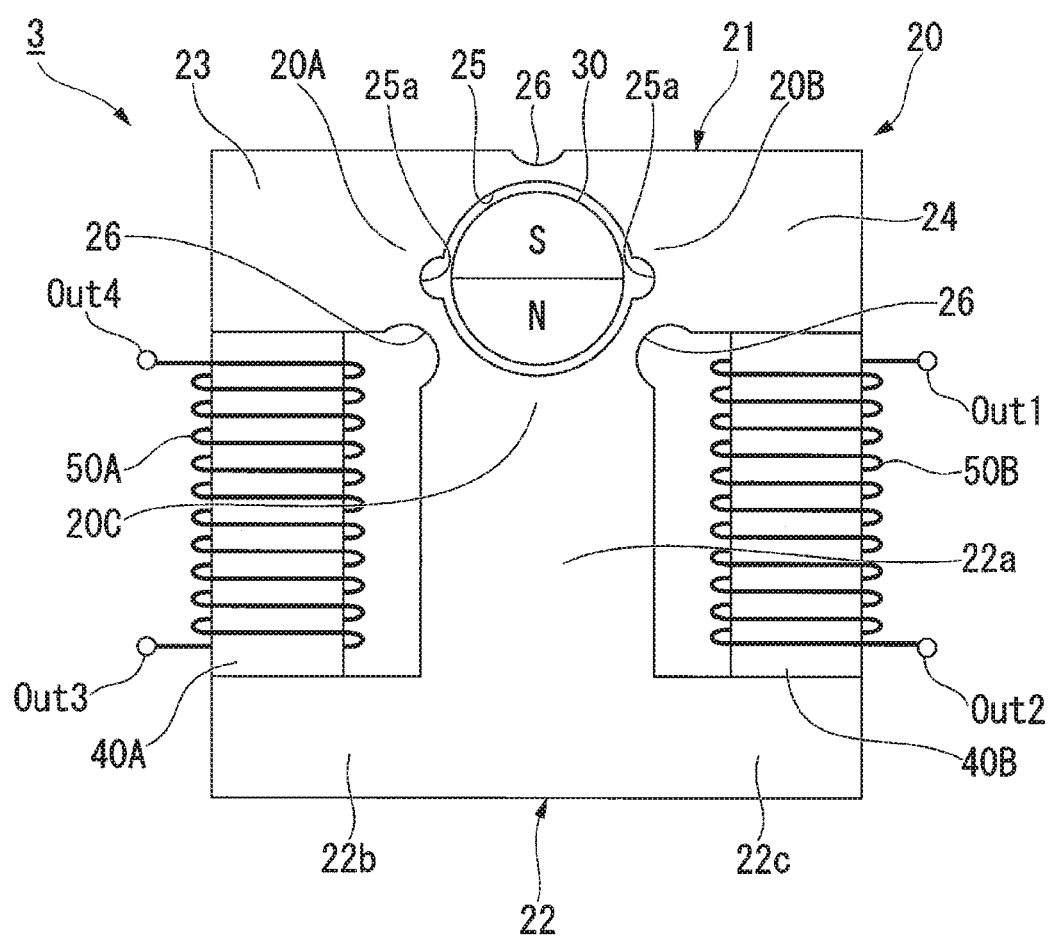
FIG. 2 is a schematic view of a stepping motor in the first embodiment.

FIG. 2 is a schematic diagram of the stepping motor 3 in the first embodiment.

As illustrated in FIG. 2, the stepping motor 3 includes the stator 20 having a rotor accommodating hole 25 and the rotor 30 having a magnetic polarity by being magnetized into two poles in the radial direction and rotatably disposed in the rotor accommodating hole 25. The stepping motor 3 operates for each unit step, and rotates the hour hand 111, the minute hand 112, the second hand 113, and the calendar display unit 114 for date display through the train wheel.

The stator 20 includes a stator body 21, a first coil core 40A and a second coil core 40B magnetically joined to the stator body 21, and a first coil 50A and a second coil 50B that are respectively wound around the coil cores 40A and 40B.

The stator body 21 is formed of a plate material using a high magnetic permeability material such as permalloy, for example. The stator body 21 includes a straight portion 22a extending in a predetermined first direction, a T-shaped first yoke 22 provided with a pair of projecting portions 22b and 22c projecting from one end of the straight portion 22a to both sides in a second direction orthogonal to the first direction, and a pair of second yokes 23 and 24 projecting from the other end of the straight portion 22a to both sides in the second direction, and is formed in an H shape in plan view. The first yoke 22 and the second yokes 23 and 24 are integrally formed. The second yoke 23 projects from the straight portion 22a to the same side as the projecting portion 22b in the second direction. The second yoke 24 projects from the straight portion 22a to the same side as the projecting portion 22c in the second direction.

At the intersection point of the first yoke 22 and the second yokes 23 and 24 of the stator body 21, the circular rotor accommodating hole 25 described above is formed. A pair of notches 25a are formed on the inner peripheral surface of the rotor accommodating hole 25 so as to face each other in the second direction. The notch 25a is cut out in an arc shape. These notches 25a are configured as positioning portions for determining a stop position of the rotor 30. The rotor 30 has the lowest potential energy and stops stably when the magnetic pole axis is at a position orthogonal to the line segment connecting the pair of notches 25a, that is, the magnetic pole axis is at a position along the first direction. Hereinafter, the stop position (position illustrated in FIG. 2) of the rotor 30 when the magnetic pole axis of the rotor 30 is along the first direction and the N-pole of the rotor 30 faces the first yoke 22 side is referred to as a first stop position. This position is also referred to as a reference position. The stop position of the rotor 30 when the magnetic pole axis of the rotor 30 is along the first direction and the S-pole of the rotor 30 faces the first yoke 22 side is referred to as a second stop position.

Around the rotor accommodating hole 25 in the stator body 21, the notches 26 cut out from the outer peripheral edge of the stator body 21 toward the rotor accommodation hole 25 are formed at three locations in plan view. Each notch 26 is formed at a corner where the first yoke 22 and the second yoke 23 are connected, a corner where the first yoke 22 and the second yoke 24 are connected, and a portion where the second yoke 23 and the second yoke 24 are connected. Each notch 26 is cut out in an arc shape.

The periphery of the rotor accommodating hole 25 in the stator body 21 is locally narrowed by each notch 26. A locally narrowed portion (narrow portion) is likely to be magnetically saturated. The stator body 21 is magnetically divided into three around the rotor accommodating hole 25 by causing magnetic saturation in the narrow portion. The stator body 21 includes a first magnetic pole portion 20A arranged at a position corresponding to the second yoke 23 around the rotor 30, a second magnetic pole portion 20B disposed at a position corresponding to the second yoke 24 around the rotor 30, and a third magnetic pole portion 20C disposed at a position corresponding to the straight portion 22a of the first yoke 22 around the rotor 30. The first magnetic pole portion 20A and the second magnetic pole portion 20B are disposed to face the S-pole (S-pole of the rotor 30 positioned at the second stop position) of the rotor 30 positioned at the first stop position. The third magnetic pole portion 20C is disposed to face the N-pole of the rotor 30 positioned at the first stop position (N-pole of the rotor 30 positioned at the second stop position).

The first coil 50A is wound around the first coil core 40A and is magnetically coupled to the first magnetic pole portion 20A and the third magnetic pole portion 20C. The first coil 50A has a first terminal Out3 and a second terminal Out4. The first coil 50A is wound in such a way that a magnetic field is generated in the first coil 50A from the projecting portion 22b side to the second yoke 23 side when a current flows from the second terminal Out4 to the first terminal Out3.

The second coil 50B is wound around the second coil core 40B and is magnetically coupled to the second magnetic pole portion 20B and the third magnetic pole portion 20C. The second coil 50B has a first terminal Out1 and a second terminal Out2. The second coil 50B is wound in such a way that a magnetic field is generated in the second coil 50B from the projecting portion 22c side to the second yoke 24 side when a current flows from the first terminal Out1 to the second terminal Out2.

A wire diameter of the first coil 50A is equal to a wire diameter of the second coil 50B. The number of windings of the first coil 50A is equal to the number of windings of the second coil 50B. The terminals of the first coil 50A and the second coil 50B are connected to the drive pulse generation circuit 14. In the following description, the potential of the second terminal Out4 of the first coil 50A is V4, the potential of the first terminal Out3 of the first coil 50A is V3, the potential of the second terminal Out2 of the second coil 50B is V2, the potential of the first terminal Out1 of the second coil 50B is set to V1.

In the stator 20 configured as described above, when magnetic flux is generated from the first coil 50A and the second coil 50B, the magnetic flux flows along the coil cores 40A and 40B and the stator body 21. Then, the polarities of the first magnetic pole portion 20A, the second magnetic pole portion 20B, and the third magnetic pole portion 20C described above are switched according to an energizing state to the first coil 50A and the second coil 50B.

Relationship Between Drive Pulse to be Applied and Stationary Position of Rotor

Figure 3:
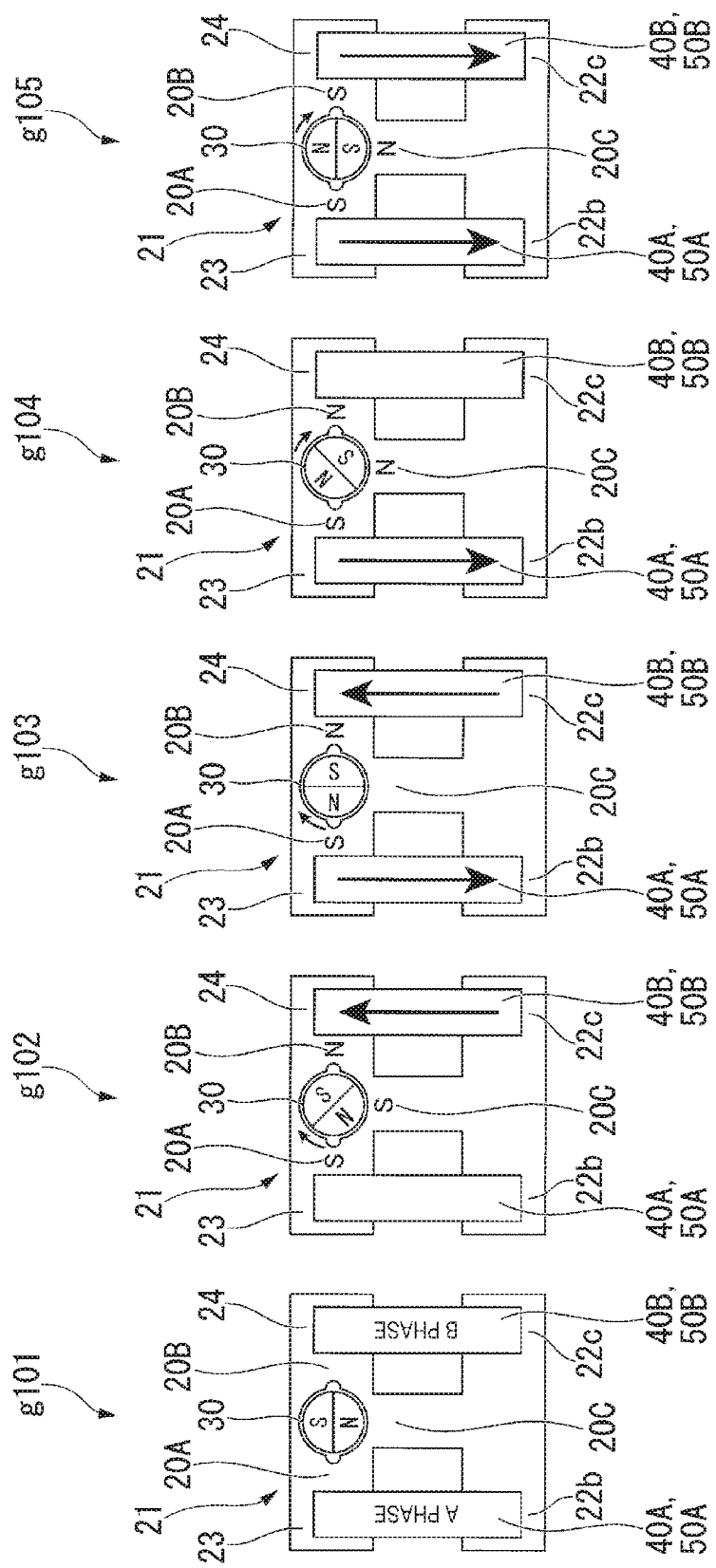
FIG. 3 is a first view illustrating a state of a rotor over time when various drive pulses are applied to the stepping motor in the first embodiment.
Figure 4:
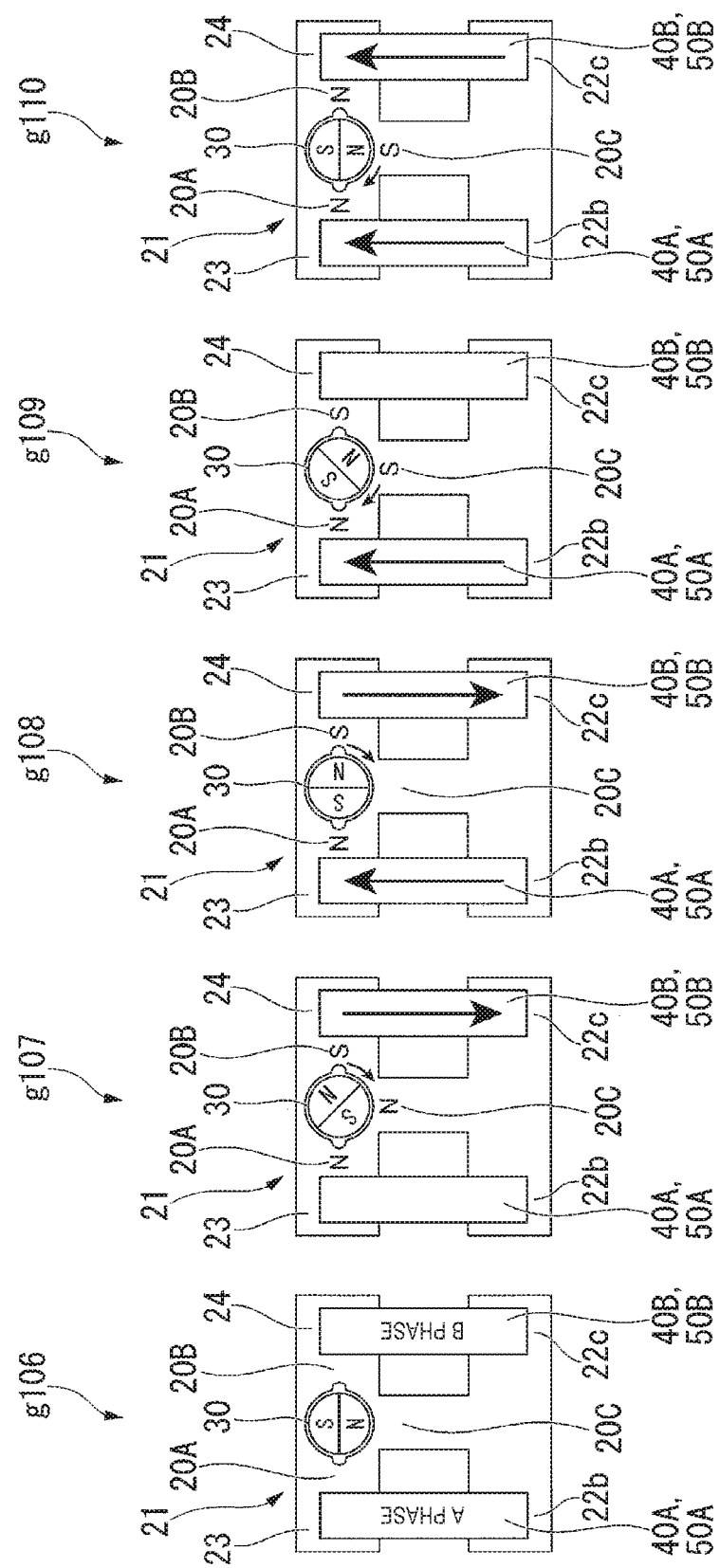
FIG. 4 is a second view illustrating the state of the rotor over time when various drive pulses are applied to the stepping motor in the first embodiment.

Next, the relationship between the drive pulse to be applied to the stepping motor 3 and the stop position of the rotor 30 will be described with reference to FIGS. 3 and 4. FIGS. 3 and 4 are views illustrating the state of the rotor 30 over time when various drive pulses are applied to the stepping motor 3. In FIGS. 3 and 4, the stepping motor 3 is illustrated by simplifying only the components necessary for the description.

Reference numeral g101 indicates a state of the stepping motor 3 in which no current flows through the first coil 50A and the second coil 50B, and no magnetic field is generated in the coil cores 40A, 40B. For that reason, the state of the stepping motor 3 represented by the reference numeral g101 is a state (hereinafter referred to as "stepping motor initial state") in which the rotor 30 is stopped at a first stop position and a rotation angle is 0 degree.

Reference numeral g102 indicates a state of the stepping motor 3 in which the drive pulse is applied to the second coil 50B by the drive pulse generation circuit 14. The state of the stepping motor 3 represented by the reference numeral g102 is a state in which the voltage V1 applied to the first terminal Out1 of the second coil 50B is H (high level), and the voltage V2 applied to the second terminal Out2 of the second coil 50B Is L (low level). A state of the stepping motor 3 represented by the Reference numeral g102 is a state in which the voltage V3 applied to the first terminal Out3 of the first coil 50A is L, and the voltage V4 applied to the second terminal Out4 of the first coil 50A is L. In the following description, such a drive pulse is referred to as a 45-degree drive pulse.

By applying the 45-degree drive pulse, a magnetic field is generated in the second coil 50B from the projecting portion 22c side toward the second yoke 24 side. With this configuration, the second magnetic pole portion 20B is excited to the N-pole, and the first magnetic pole portion 20A and the third magnetic pole portion 20C are excited to be the S-pole. As a result, the S-pole of the rotor 30 is attracted to the N-pole of the second magnetic pole portion 20B, and the rotor 30 has a stable stationary position at an angle of 45 degrees in a positive direction. The stable stationary position may vary by approximately 15 to 75 degrees depending on the stator design. The rotor 30 may rotate beyond the stable stationary position depending on the drive voltage or the load, but when the rotor 30 exceeds the stable stationary position, torque acts as a brake.

In the first embodiment, a position where the rotor 30 is magnetically stable and stationary when a non-excited state or an excited state (drive pulse) is continued is referred to as a stable stationary position.

Reference numeral g103 indicates a state of the stepping motor 3 in which a drive pulse is further applied to the first coil 50A by the drive pulse generation circuit 14, in the state of the reference numeral g102. The state of the stepping motor 3 indicated by the reference numeral g103 is a state in which the voltage V3 applied to the first terminal Out3 of the first coil 50A is H and the voltage V4 applied to the second terminal Out4 of the first coil 50A is L. In the following description, such a drive pulse is referred to as a 90-degree drive pulse.

In addition to the generation of a magnetic field from the projecting portion 22c side toward the second yoke 24 side in the second coil 50B, a magnetic field is generated in the first coil 50A from the second yoke 23 side toward the projecting portion 22b side by application of the drive pulse of 90 degrees. With this configuration, the second magnetic pole portion 20B is excited to the N-pole, and the first magnetic pole portion 20A is excited to be the S-pole. As a result, the S-pole of the rotor 30 is attracted to the N-pole of the second magnetic pole portion 20B, the N-pole of the rotor 30 is further attracted to the S-pole of the first magnetic pole portion 20A, and the rotor 30 has a stable stationary position at an angle of 90 degrees in the positive direction.

The rotor 30 may rotate beyond the stable stationary position depending on the drive voltage or the load, but when the rotor 30 exceeds the stable stationary position, torque acts as a brake.

Reference numeral g104 indicates a state of the stepping motor 3 in which the application of the drive pulse applied to the second coil 50B by the drive pulse generation circuit 14 in the state of the reference numeral g103 is stopped and only the drive pulse is applied to the first coil 50A. In the following description, such a drive pulse is referred to as a 135-degree drive pulse.

By applying the 135-degree drive pulse, a magnetic field is generated in the first coil 50A from the second yoke 23 side toward the projecting portion 22b side. With this configuration, the second magnetic pole portion 20B and the third magnetic pole portion 20C are excited to the N-pole, and the first magnetic pole portion 20A is excited to be the S-pole. As a result, the S-pole of the rotor 30 is attracted to the N-pole of the third magnetic pole portion 20C, and the rotor 30 has a stable stationary position at an angle of 135 degrees in the positive direction. The stable stationary position may vary by approximately ±15 degrees with respect to 135 degrees depending on the stator design. The rotor 30 may rotate beyond the stable stationary position depending on the drive voltage or the load, but when the rotor 30 exceeds the stable stationary position, torque acts as a brake.

Reference numeral g105 indicates a state of the stepping motor 3 in which the application of the drive pulse to the second coil 50B by the drive pulse generation circuit 14 is started again in the state of the reference numeral g104. The state of the stepping motor 3 indicated by the reference numeral g105 is a state in which the voltage V4 applied to the first terminal Out1 of the second coil 50B is L and the voltage V2 applied to the second terminal Out2 of the second coil 50B is H. In the following description, such a drive pulse is referred to as a 180-degree drive pulse.

In addition to the generation of a magnetic field from the second yoke 23 side toward the projecting portion 22b side in the first coil 50A, a magnetic field is generated from the second yoke 24 side toward the projecting portion 22c side in the second coil 50B by application of the 180-degree drive pulse. With this configuration, the third magnetic pole portion 20C is excited to the N-pole, and the first magnetic pole portion 20A and the second magnetic pole portion 20B are excited to be the S-pole. As a result, the S-pole of the rotor 30 is attracted to the N-pole of the third magnetic pole portion 20C, and the N-pole of the rotor 30 is attracted to the S-pole of the first magnetic pole portion 20A and the S-pole of the second magnetic pole portion 20B, and the rotor 30 has a stable stationary position which is the second stop position at an angle of 180 degrees in the positive direction. The rotor 30 may rotate beyond the stable stationary position depending on the drive voltage or the load, but when the rotor 30 exceeds the stable stationary position, torque acts as a brake.

The description will be continued with reference to FIG. 4.

Reference numeral g106 indicates a state of the stepping motor 3 in which the rotor 30 is stopped at the second stop position at an angle of 180 degrees in the positive direction.

Reference numeral g107 indicates a state of the stepping motor 3 in which the drive pulse is applied to the second coil 50B by the drive pulse generation circuit 14. The state of the stepping motor 3 represented by the reference numeral 107 is a state in which the voltage V1 applied to the first terminal Out1 of the second coil 50B is L and the voltage V2 applied to the second terminal Out2 of the second coil 50B is H. In the following description, such a drive pulse is referred to as a 225-degree drive pulse.

By applying the 225-degree drive pulse, a magnetic field is generated in the second coil 50B from the second yoke 24 side toward the projecting portion 22c side. With this configuration, the second magnetic pole portion 20B is excited to the S-pole, and the first magnetic pole portion 20A and the third magnetic pole portion 20C are excited to be the N-pole. As a result, the S-pole of the rotor 30 is attracted to the N-pole of the first magnetic pole portion 20A and the third magnetic pole portion 20C, the N-pole of the rotor 30 is attracted to the S-pole of the second magnetic pole portion 20B, and the rotor 30 has a stable stationary position at an angle of 225 degrees in the positive direction. The stable stationary position may vary by approximately ±15 degrees with respect to 225 degrees, depending on the stator design. The rotor 30 may rotate beyond the stable stationary position depending on the drive voltage or the load, but when the rotor 30 exceeds the stable stationary position, torque acts as a brake.

Reference numeral g108 indicates a state of the stepping motor 3 in which the drive pulse is further applied to the first coil 50A by the drive pulse generation circuit 14 in the state of reference numeral g107. The state of the stepping motor 3 represented by the reference numeral g108 is a state in which the voltage V3 applied to the first terminal Out3 of the first coil 50A is L and the voltage V4 applied to the second terminal Out4 is H. In the following description, such a drive pulse is referred to as a 270-degree drive pulse.

In addition to the generation of the magnetic field from the second yoke 24 side to the projecting portion 22c side in the second coil 50B, a magnetic field is generated in the first coil 50A from the projecting portion 22b side toward the second yoke 23 side by application of the 270-degree drive pulse. With this configuration, the first magnetic pole portion 20A is excited to be the N-pole, and the second magnetic pole portion 20B is excited to the S-pole. As a result, the S-pole of the rotor 30 is attracted to the N-pole of the first magnetic pole portion 20A, the N-pole of the rotor 30 is attracted to the S-pole of the second magnetic pole portion 20B, and the rotor 30 has a stable stationary position at an angle of 270 degrees in the positive direction. The rotor 30 may rotate beyond the stable stationary position depending on the drive voltage or the load, but when the rotor 30 exceeds the stable stationary position, torque acts as a brake.

Reference numeral g109 indicates a state of the stepping motor 3 in which the application of the drive pulse applied to the second coil 50B by the drive pulse generation circuit 14 in the state of the reference g108 is stopped and only the drive pulse is applied to the first coil 50A. In the following description, such a drive pulse is referred to as a 315-degree drive pulse.

By applying the 315-degree drive pulse, a magnetic field is generated in the first coil 50A from the projecting portion 22b side toward the second yoke 23 side. With this configuration, the second magnetic pole portion 20B and the third magnetic pole portion 20C are excited to the S-pole, and the first magnetic pole portion 20A is excited to be the N-pole. As a result, the N-pole of the rotor 30 is attracted to the S-pole of the second magnetic pole portion 20B and the third magnetic pole portion 20C, and the rotor 30 has a stable stationary position at an angle of 315 degrees in the positive direction. Depending on the stator design, the stable stationary position may change by about ±15 degrees with respect to 315 degrees. The rotor 30 may rotate beyond the stable stationary position depending on the drive voltage or the load, but when the rotor 30 exceeds the stable stationary position, torque acts as a brake.

Reference numeral g110 represents a state of the stepping motor 3 in which application of the drive pulse to the second coil 50B by the drive pulse generation circuit 14 is started again in the state of the reference numeral g109. The state of the stepping motor 3 represented by the reference numeral g110 is a state in which the voltage V4 applied to the first terminal Out1 of the second coil 50B is H and the voltage V2 applied to the second terminal Out2 of the second coil 50B is L. In the following description, such a drive pulse is referred to as a 0-degree drive pulse.

In addition to the generation of a magnetic field from the projecting portion 22b side toward the second yoke 23 side in the first coil 50A, a magnetic field is generated in the second coil 50B from the projecting portion 22c side to the second yoke 24 side by the application of the drive pulse of 0-degree drive pulse. With this configuration, the third magnetic pole portion 20C is excited to the S-pole, and the first magnetic pole portion 20A and the second magnetic pole portion 20B are excited to be the N-pole. As a result, the N-pole of the rotor 30 is attracted to the S-pole of the third magnetic pole portion 20C, the S-pole of the rotor 30 is attracted to the N-pole of the first magnetic pole portion 20A and the second magnetic pole portion 20B, and the rotor 30 has a stable stationary position at an angle of 0 degree (360 degrees) in the positive direction. The rotor 30 may rotate beyond the stable stationary position depending on the drive voltage or the load, but when the rotor 30 exceeds the stable stationary position, torque acts as a brake.

Figures 5, 6:
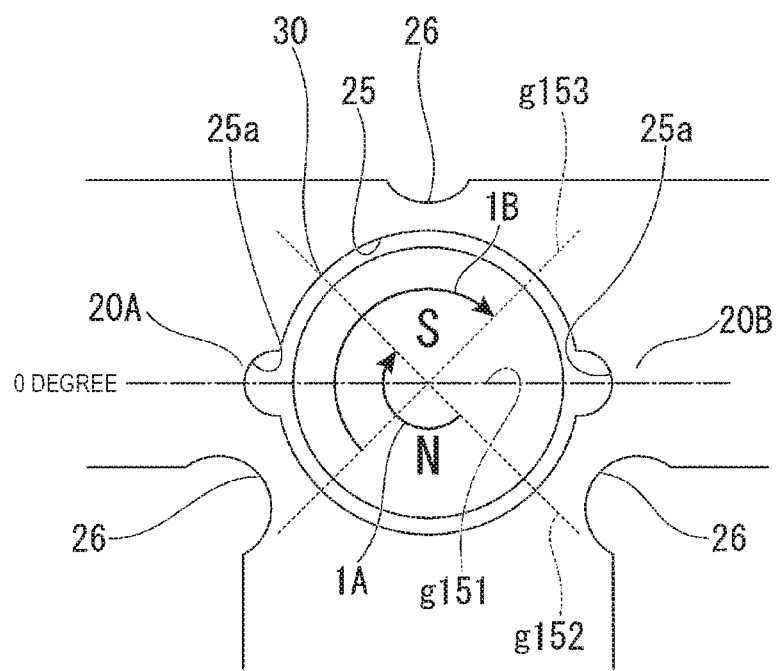
FIG. 5 is a table summarizing voltage levels applied to each terminal and polarity of each magnetic pole portion when each drive pulse is applied in the first embodiment.
FIG. 6 is a diagram for explaining a torque generation area of the drive pulse in the first embodiment.

The relationship illustrated in FIGS. 3 and 4 can be summarized as illustrated in FIG. 5. FIG. 5 is a table in which the voltage levels applied to the terminals of the first coil 50A and the second coil 50B and the polarities of the first magnetic pole portion 20A, the second magnetic pole portion 20B, and the third magnetic pole portion 20C when each drive pulse is applied are summarized.

Torque Generation Area of Drive Pulse in First Embodiment

Next, a torque generation area of a drive pulse in the first embodiment will be described with reference to FIGS. 6 to 8.

FIG. 6 is a diagram for explaining the torque generation area of the drive pulse in the first embodiment. In FIG. 6, a Reference numeral g151 is a line segment connecting the pair of notches 25a, and this angle is 0 degree. Reference numerals g152 and 1A represent a torque generation areas when a drive pulse that rotates the rotor 30 by 45 degrees is applied. Reference numerals g153 and 1B represent a torque generation area when a drive pulse that rotates the rotor 30 by 135 degrees is applied.

Figures 7, 8:
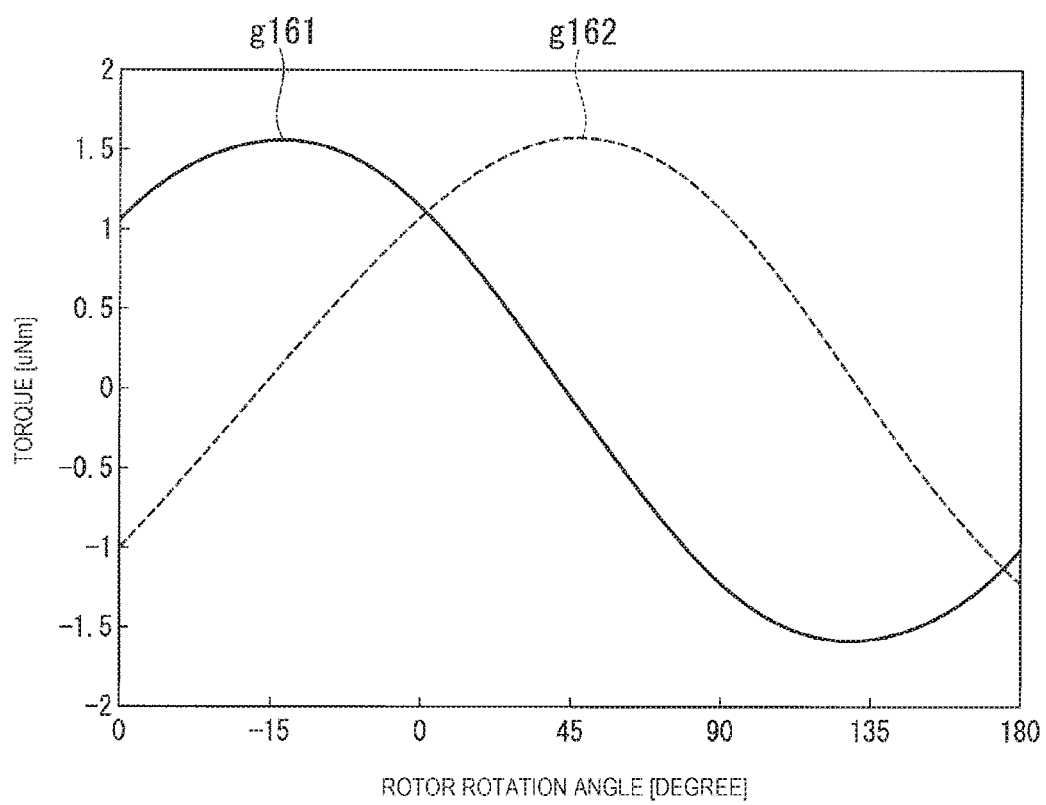
FIG. 7 is a graph illustrating a relationship between a rotor rotation angle and torque in the first embodiment.
FIG. 8 is a table illustrating a torque generation direction of the drive pulse in the first embodiment.

FIG. 7 is a graph illustrating a relationship between a rotor rotation angle and torque in the first embodiment. In FIG. 7, the horizontal axis represents the rotor rotation angle [degree], and the vertical axis represents the torque [µNm]. Reference numeral g161 represents torque characteristics when a drive pulse that rotates the rotor 30 by 45 degrees is applied. Reference numeral g162 represents torque characteristics when a drive pulse that rotates the rotor 30 by 135 degrees is applied.

FIG. 8 is a table illustrating a torque generation direction of the drive pulse in the first embodiment. In FIG. 8, the reference numeral 1A corresponds to the reference numeral 1A in FIG. 6, and corresponds to the torque characteristic represented by the reference numeral g161 in FIG. 7. In FIG. 8, the reference numeral 1B corresponds to the reference numeral 1B in FIG. 6 and corresponds to the torque characteristics represented by the reference numeral g162 in FIG. 7.

As illustrated in FIG. 8, the polarity of torque when the rotor rotation angle is rotated in the positive direction from 0 to 45 degrees corresponds to the positive direction in the case of 1A and the positive direction in the case of 1B as illustrated in FIG. 7. In the case of non-excitation, the polarity of torque corresponds to the negative direction.

The polarity of torque when the rotor rotation angle is rotated in the positive direction from 45 to 90 degrees corresponds to the negative direction in the case of 1A and the positive direction in the case of 1B as illustrated in FIG. 7. In the case of no excitation, the polarity of torque corresponds to the negative direction.

The polarity of torque when the rotor rotation angle is rotated in the positive direction from 90 to 135 degrees corresponds to the negative direction in the case of 1A and the positive direction in the case of 1B as illustrated in FIG. 7. In the case of no excitation, the polarity of torque corresponds to the positive direction.

The polarity of torque when the rotor rotation angle is rotated in the positive direction from 135 to 180 degrees corresponds to the negative direction in the case of 1A and the positive direction in the case of 1B as illustrated in FIG. 7. In the case of no excitation, the polarity of torque corresponds to the positive direction.

Here, the positive direction of the torque generation direction indicates that torque that causes the rotor to rotate in the positive direction is generated. The negative direction of the torque generation direction indicates that torque that rotates the rotor to return is generated. In FIG. 7, a switching position from positive to negative is the stable stationary position.

Drive Pulse in Fast-Forwarding Forward Rotation Hand Movement Mode of First Embodiment Next, a drive pulse in the fast-forwarding forward rotation hand movement mode of the first embodiment will be described with reference to FIGS. 9 to 11.

Figure 9:
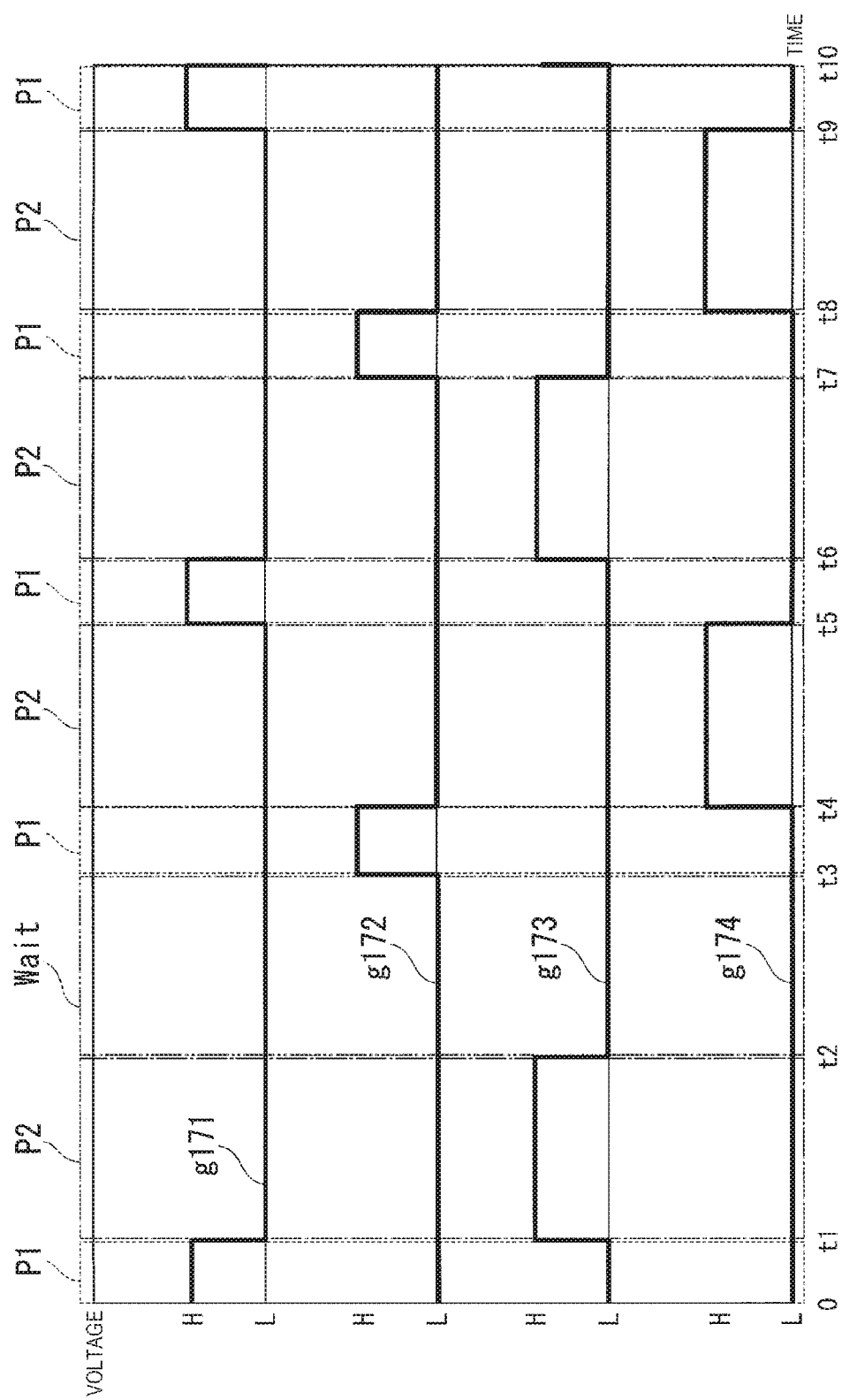
FIG. 9 is a diagram illustrating an example of a waveform of the drive pulse in a fast-forwarding forward rotation hand movement mode in the first embodiment.

FIG. 9 is a diagram illustrating an example of a waveform of the drive pulse in the fast-forwarding forward rotation hand movement mode according to the first embodiment. In FIG. 9, the horizontal axis represents time, and the vertical axis represents voltage. The "H" indicates a high level and "L" indicates a low level. The H is, for example, 3 V, and the L is, for example, 0 V. Reference numeral g171 indicates a drive pulse applied to the first terminal Out1 of the second coil 50B by the drive pulse generation circuit 14. Reference numeral g172 indicates a drive pulse applied to the second terminal Out2 of the second coil 50B by the drive pulse generation circuit 14. Reference numeral g173 indicates a drive pulse to the first terminal Out3 of the first coil 50A applied by the drive pulse generation circuit 14. Reference numeral g174 indicates a drive pulse applied to the second terminal Out4 of the first coil 50A by the drive pulse generation circuit 14.

Figure 10:
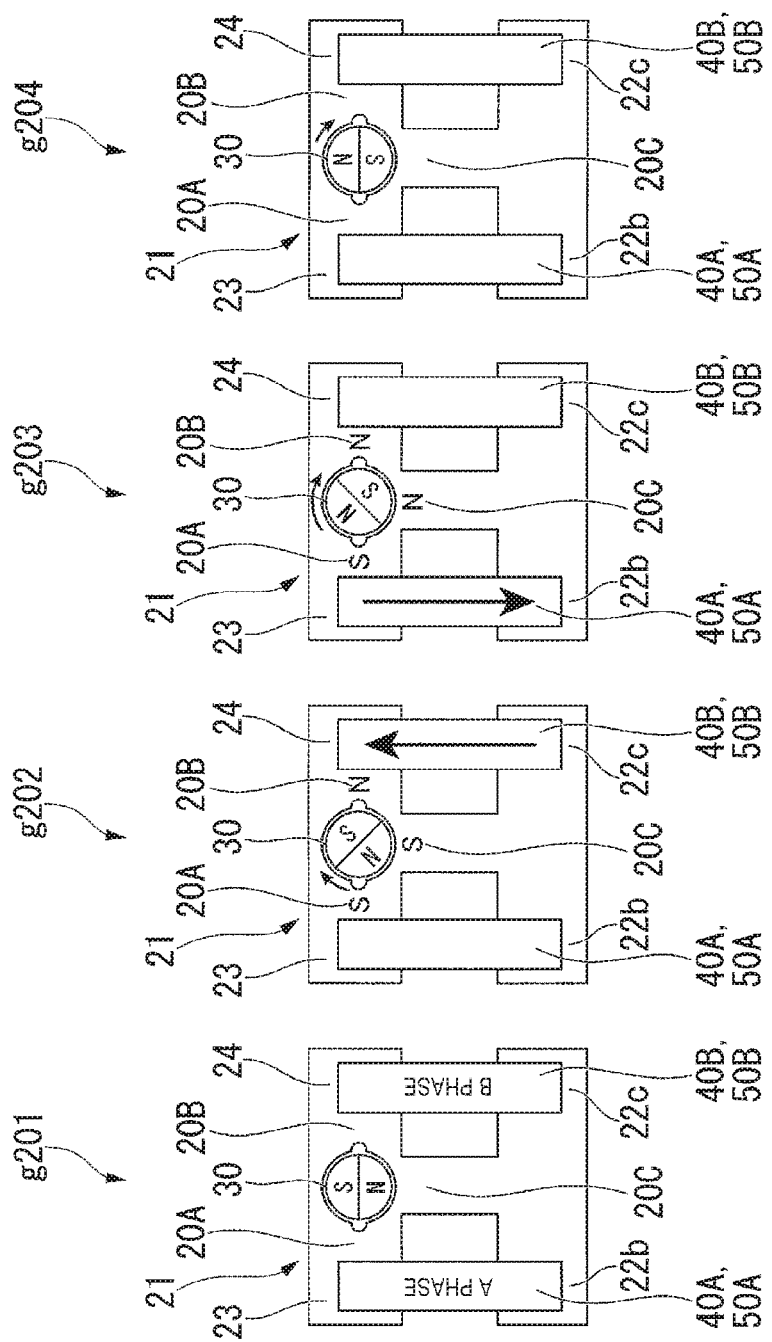
FIG. 10 is a first view illustrating a state of the stepping motor when a forward drive pulse is applied in the first embodiment.
Figure 11:
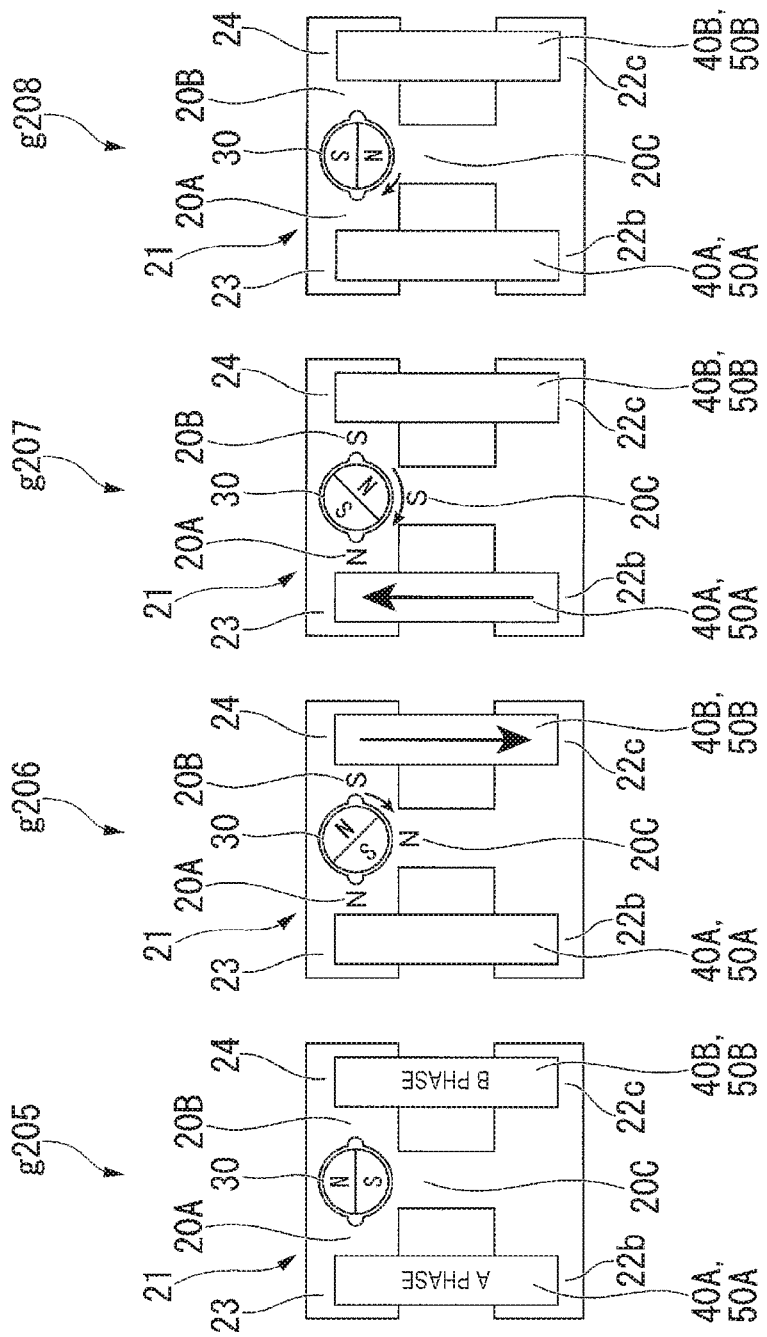
FIG. 11 is a second view illustrating the state of the stepping motor when the forward drive pulse is applied in the first embodiment.

FIGS. 10 and 11 are diagrams illustrating a state of the stepping motor 3 when a forward drive pulse is applied in the first embodiment.

First, rotation from 0 to 180 degrees will be described.

Reference numeral g201 in FIG. 10 indicates a state in which a drive pulse is not applied to the first coil 50A and the second coil 50B and the rotor is stopped. In this case, the rotation angle of the rotor 30 is 0 degree. Time 0 is the time when hand movement in the fast-forwarding forward rotation hand movement mode is started. The time when the fast-forwarding forward rotation hand movement mode is started is, for example, the time when the drive pulse is first applied to the stepping motor 3 after the fast-forwarding forward rotation hand movement mode is selected by operating the crown 103.

(Step S1) During the period from time 0 to t1, the drive pulse generation circuit 14 applies the 45-degree drive pulse to the stepping motor 3 as a drive pulse P1 (first pulse). That is, as indicated by the reference numerals g171 and g172 in FIG. 9, the drive pulse generation circuit 14 applies the H to the first terminal Out1 of the second coil 50B and applies the L to the second terminal Out2 of the second coil 50B. As indicated by the reference numerals g173 and g174, the drive pulse generation circuit 14 applies the L to the first terminal Out3 and the second terminal Out4 of the first coil 50A. The fact that the L is applied by the drive pulse generation circuit 14 means that the drive pulse is not applied by the drive pulse generation circuit 14. The period of the drive pulse P1 is approximately 0.75 ms.

As a result of applying the drive pulse P1, a magnetic field is generated as indicated by the reference numeral g202 in FIG. 10, and the rotor 30 starts to rotate in the positive direction (clockwise). When the stable stationary position of the 45-degree drive pulse is exceeded depending on the drive voltage and load size, torque acts as a brake.

(Step S2) Subsequently, during the period from time t1 to time t2, the drive pulse generation circuit 14 applies the 135-degree drive pulse to the stepping motor 3 as a drive pulse P2 (second pulse). That is, as indicated by the reference numerals g171 and g172 in FIG. 9, the drive pulse generation circuit 14 applies the L to the first terminal Out1 and the second terminal Out2 of the second coil 50B. As indicated by the reference numerals g173 and g174, the drive pulse generation circuit 14 applies the H to the first terminal Out3 of the first coil 50A and applies the L to the second terminal Out4 of the first coil 50A. The period of the drive pulse P2 is approximately 2.25 ms.

As a result of applying the drive pulse P2, a magnetic field is generated as indicated by the reference numeral g203 in FIG. 10, and the rotor 30 continues to rotate in the positive direction and rotates 90 degrees or more.

(Step S3) Subsequently, during the period from time t2 to t3, the drive pulse generation circuit 14 does not apply the drive pulse for a predetermined period. Hereinafter, the predetermined period during which the drive pulse generation circuit 14 does not apply the drive pulse is referred to as a waiting period (Wait). During the waiting period, as indicated by the reference numerals g171 and g172 in FIG. 9, the drive pulse generation circuit 14 applies the L to the first terminal Out1 and the second terminal Out2 of the second coil 50B. As indicated by the reference numerals g173 and g174, the drive pulse generation circuit 14 applies the L to the first terminal Out3 and the second terminal Out4 of the first coil 50A. The waiting period is approximately 0.5 to 2 ms.

Due to this waiting period, as indicated by the reference numeral g204 in FIG. 10, the rotor 30 rotates due to inertia from the 135-degrees rotation position to 180 degrees of the second stop position, which is a stable stop position, and stops at a stable stationary position in a non-excitation state.

Next, rotation from 180 to 0 degrees will be described.

Reference numeral g205 in FIG. 11 indicates a state in which a drive pulse is not applied to the first coil 50A and the second coil 50B and the rotor is stopped. In this case, the rotation angle of the rotor 30 is 180 degrees.

(Step S4) Subsequently, during the period from time t3 to time t4, the drive pulse generation circuit 14 applies the 225-degree drive pulse to the stepping motor 3 as the drive pulse P1. That is, as indicated by the reference numerals g171 and g172 in FIG. 9, the drive pulse generation circuit 14 applies the L to the first terminal Out1 of the second coil 50B and applies the H to the second terminal Out2 of the second coil 50B. As indicated by the reference numerals g173 and g174, the drive pulse generation circuit 14 applies the L to the first terminal Out3 and the second terminal Out4 of the first coil 50A. The period of the drive pulse P1 is approximately 0.75 ms.

As a result of applying the drive pulse P1, a magnetic field is generated as indicated by the reference numeral g206 in FIG. 11, and the rotor 30 starts to rotate in the positive direction. When the stable stationary position of the 225-degree drive pulse is exceeded depending on the drive voltage and load size, torque acts as a brake.

(Step S5) Subsequently, during the period from time t4 to time t5, the drive pulse generation circuit 14 applies the 315-degree drive pulse to the stepping motor 3 as the drive pulse P2. That is, as indicated by the reference numerals g171 and g172 in FIG. 9, the drive pulse generation circuit 14 applies the L to the first terminal Out1 and the second terminal Out2 of the second coil 50B. As indicated by the reference numerals g173 and g174, the drive pulse generation circuit 14 applies the L to the first terminal Out3 of the first coil 50A and applies the H to the second terminal Out4 of the first coil 50A. The period of the drive pulse P2 is approximately 2.25 ms.

As a result of applying the drive pulse P2, a magnetic field is generated as indicated by the reference numeral g207 in FIG. 11, and the rotor 30 continues to rotate in the positive direction and rotates 90 degrees or more.

(Step S6) Subsequently, during the period from time t5 to time t6, similarly to the period from time 0 to time t1, the drive pulse generation circuit 14 applies the 45-degree drive pulse to the stepping motor 3 as the drive pulse P1. Similarly to the period from time 0 to t1, the drive pulse generation circuit 14 applies the L to the first terminal Out3 and the second terminal Out4 of the first coil 50A.

As a result of applying the drive pulse P1, a magnetic field is generated as indicated by the reference numeral g202 in FIG. 10, and the rotor 30 starts to rotate in the positive direction (clockwise). When the stable stationary position of the 45-degree drive pulse is exceeded depending on the drive voltage and load size, torque acts as a brake.

(Step S7) Subsequently, during the period from time t6 to t7, similarly to the period from time t1 to t2, the drive pulse generation circuit 14 applies the 135-degree drive pulse to the stepping motor 3 as the drive pulse P2 (second pulse). Similarly to the period from time t1 to time t2, the drive pulse generation circuit 14 applies the H to the first terminal Out3 of the first coil 50A and applies the L to the second terminal Out4 of the first coil 50A.

As a result of applying the drive pulse P2, a magnetic field is generated as indicated by the reference numeral g203 in FIG. 10, and the rotor 30 continues to rotate in the positive direction and rotates 90 degrees or more.

(Step S8) Subsequently, during the period from time t7 to time t8, similarly to the period from time t3 to time t4, the drive pulse generation circuit 14 applies the 225-degree drive pulse to the stepping motor 3 as the drive pulse P1. Similarly to the period from time t3 to time t4, the drive pulse generation circuit 14 applies the L to the first terminal Out3 and the second terminal Out4 of the first coil 50A.

(Step S9) Subsequently, during the period from time t8 to t9, similarly to the period from time t4 to t5, the drive pulse generation circuit 14 applies the 315-degree drive pulse to the stepping motor 3 as the drive pulse P2. Similarly to the period from time t4 to t5, the drive pulse generation circuit 14 applies the L to the first terminal Out3 of the first coil 50A and applies the H to the second terminal Out4 of the first coil 50A.

As a result of applying the drive pulse P2, a magnetic field is generated as indicated by the reference numeral g207 in FIG. 11, and the rotor 30 continues to rotate in the positive direction and rotates 90 degrees or more.

After time t9, a drive pulse similar to the drive pulse applied to the stepping motor 3 in the period from time t5 to t9 is repeatedly applied to the stepping motor 3. As the waveform of the drive pulse, a waveform similar to the waveform in the period from time t5 to t9 is repeated.

As described above, in the fast-forwarding forward rotation hand movement mode, the drive pulse generation circuit 14 first executes a first forward rotation initialization process. The first forward rotation initialization process is a process for setting the state of the stepping motor 3 to an initial state of the stepping motor in the fast-forwarding forward rotation hand movement mode. Specifically, the first forward rotation initialization process is a process in which a drive pulse is successively applied to the stepping motor 3 in the order of the 45-degree drive pulse P1 and the 135-degree drive pulse P2, and then a waiting period is generated. Next, the drive pulse generation circuit 14 repeatedly executes a first forward rotation process. The first forward rotation process is a process in which drive pulses are successively applied to the stepping motor 3 in the order of the 225-degree drive pulse P1, 315-degree drive pulse P2, 45-degree drive pulse P1, and 135-degree drive pulse.

Hereinafter, the process in which the drive pulse P2 is continuously applied after the drive pulse P1 is applied is referred to as one unit process.

As described above, the drive pulse P1 in the first embodiment is a drive pulse that rotates 45 degrees from the reference position (0 degree) and has a stable stationary position at 90 degrees or less. The drive pulse P2 in the first embodiment is a drive pulse that rotates 135 degrees from the reference position (0 degrees) and has a stable stationary position at 90 degrees or more.

Drive Pulse During Reverse Pole in First Embodiment

Next, the drive pulse during reverse polarity in the first embodiment will be described with reference to FIGS. 9, 11, and 12.

Figure 12:
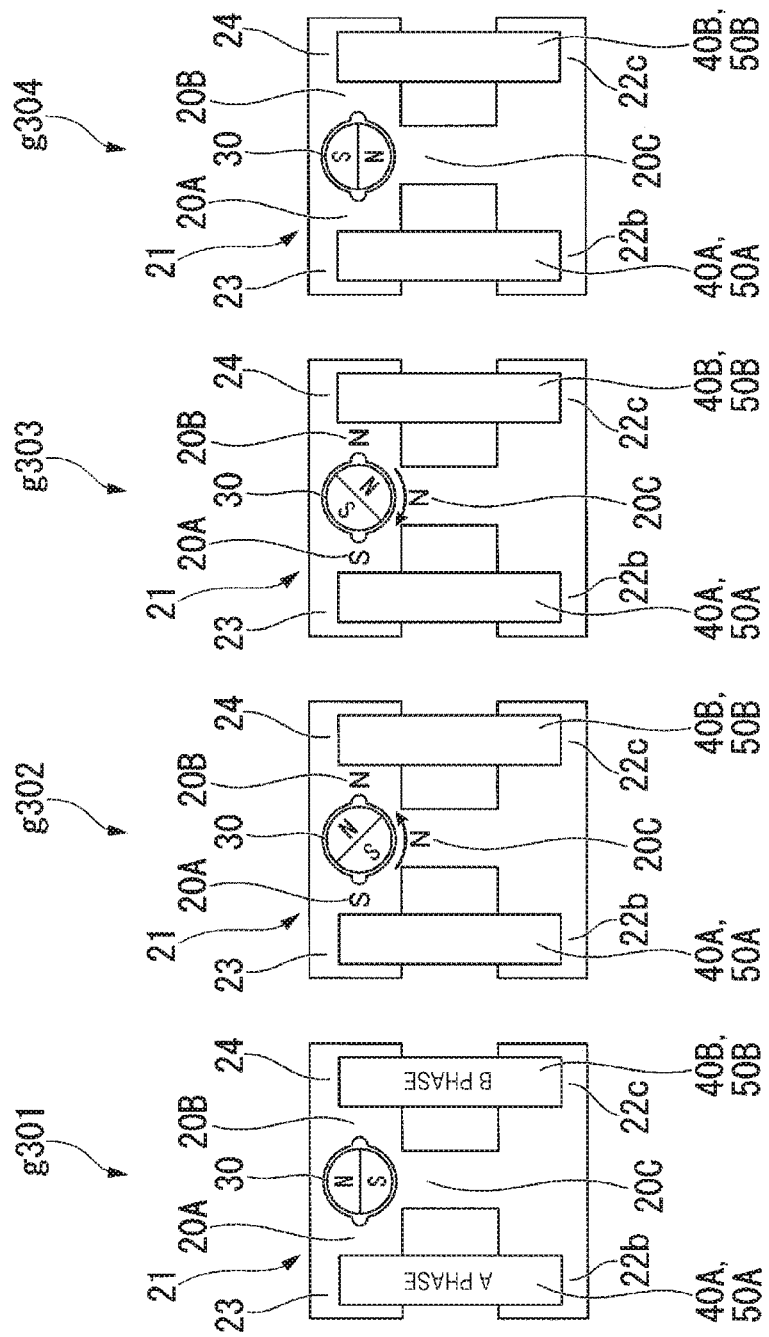
FIG. 12 is a diagram illustrating a state of the stepping motor when the drive pulse is applied during reverse pole in the first embodiment.

FIG. 12 is a diagram illustrating a state of the stepping motor 3 when a drive pulse is applied during reverse pole in the first embodiment. FIG. 12 is an example in which, for example, the analog electronic timepiece 1 is dropped and the polarity of the rotor 30 and the polarity of the drive pulse are shifted.

Reference numeral g301 in FIG. 12 is a state in which no drive pulse is applied to the first coil 50A and the second coil 50B, and the rotor is stopped. In this case, the rotation angle of the rotor 30 is 180 degrees.

During the period from time 0 to t1 in FIG. 9, the drive pulse generation circuit 14 applies the 45-degree drive pulse as the drive pulse P1 to the stepping motor 3.

As a result of applying the drive pulse P1, a magnetic field is generated in the second coil core 40B and the second coil 50B as indicated by the reference numeral g302 in FIG. 12, and the rotor 30 starts to rotate in the negative direction (counterclockwise). By applying the drive pulse P1, the rotor 30 is in a stepped-out state.

Subsequently, during the period from time t1 to time t2 in FIG. 9, the drive pulse generation circuit 14 applies the 135-degree drive pulse to the stepping motor 3 as the drive pulse P2.

As a result of applying the drive pulse P2, a magnetic field is generated in the first coil core 40A and the first coil 50A as indicated by the reference numeral g303 in FIG. 12, and the rotor 30 is reversed and starts to rotate in the positive direction.

Subsequently, during the period from time t2 to time t3 in FIG. 9, the drive pulse generation circuit 14 does not apply the drive pulse. That is, a period from time t2 to t3 is a waiting period.

Due to this waiting period, as illustrated by the reference numeral g304 in FIG. 12, the rotor 30 rotates by inertia from the rotation position of −45 degrees to 180 degrees of the second stop position, which is a stable stop position, and stops at a stable stationary position in a non-excited state.

As such, the analog electronic timepiece 1 returns the rotor 30 from the stepped-out state to a state in which the rotor 30 returns to the original rotation angle by the first forward rotation initialization process in the fast-forwarding forward rotation hand movement mode. As such, when the polarity of the rotor 30 and the polarity of the drive pulse are shifted, the polarity of the rotor 30 and the polarity of the drive pulse coincide with each other after the step-out of the total period of the unit processing period and the waiting period.

Drive Pulse in Fast-Forwarding Reverse Rotation Hand Movement Mode of First Embodiment Next, a drive pulse in the fast-forwarding reverse rotation hand movement mode will be described.

Figure 13:
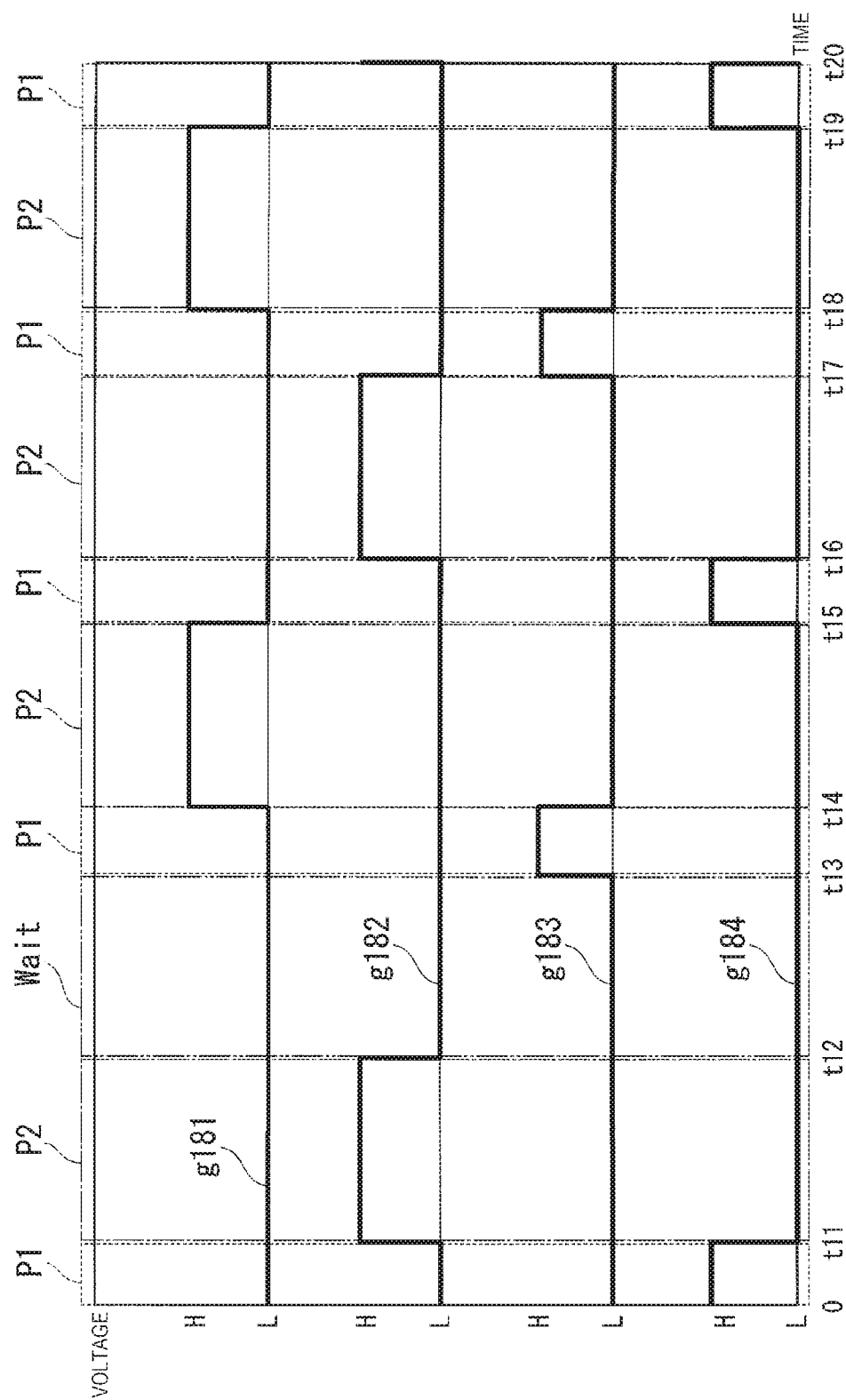
FIG. 13 is a diagram illustrating an example of a waveform of the drive pulse in a fast-forwarding reverse rotation hand movement mode in the first embodiment.

FIG. 13 is a diagram illustrating an example of a waveform of a drive pulse in the fast-forwarding reverse rotation hand movement mode of the first embodiment. Reference numeral g181 indicates a drive pulse applied to the first terminal Out1 of the second coil 50B by the drive pulse generation circuit 14. Reference numeral g182 is a drive pulse applied to the second terminal Out2 of the second coil 50B by the drive pulse generation circuit 14. Reference numeral g183 indicates a drive pulse applied to the first terminal Out3 of the first coil 50A by the drive pulse generation circuit 14. Reference numeral g184 is a drive pulse applied to the second terminal Out4 of the first coil 50A by the drive pulse generation circuit 14.

(Step S11) During the period from time 0 to t11 in FIG. 13, the drive pulse generation circuit 14 applies the 315-degree drive pulse to the stepping motor 3 as the drive pulse P1. That is, the drive pulse generation circuit 14 applies the L to the first terminal Out1 and the second terminal Out2 of the second coil 50B, as indicated by the reference numerals g181 and g182. As indicated by the reference numerals g183 and g184, the drive pulse generation circuit 14 applies the L to the first terminal Out3 of the first coil 50A and applies the H to the second terminal Out4 of the first coil 50A. The period of the drive pulse P1 is approximately 0.75 ms.

As a result of applying the drive pulse P1, the rotor 30 starts to rotate in the negative direction. When the stable stationary position of a −45-degree drive pulse is exceeded depending on the drive voltage and load size, torque acts as a brake.

(Step S12) Subsequently, during the period from time t11 to time t12, the 225-degree drive pulse is applied to the stepping motor 3 as the drive pulse 12. That is, the drive pulse generation circuit 14 applies the L to the first terminal Out1 of the second coil 50B and applies the H to the second terminal Out2 of the second coil 50B. The drive pulse generation circuit 14 applies the L to the first terminal Out3 and the second terminal Out4 of the first coil 50A. The period of the drive pulse P2 is approximately 2.25 ms.

As a result of applying the drive pulse P2, the rotor 30 continues to rotate in the negative direction and rotates by −90 degrees or more.

(Step S13) Subsequently, during the period of time t12 to t13, the drive pulse generation circuit 14 does not apply a drive pulse. That is, the period from t12 to t13 is a waiting period.

During this waiting period, the rotor 30 rotates by inertia from the rotation position of −135 degrees to −180 degrees of the second stop position, which is a stable stop position, and stops at a stable stationary position in a non-excited state.

(Step S14) Subsequently, during the period from time t13 to t14, the drive pulse generation circuit 14 applies the 135-degree drive pulse to the stepping motor 3 as the drive pulse P1. That is, the drive pulse generation circuit 14 applies the L to the first terminal Out1 and the second terminal Out2 of the second coil 50B. The drive pulse generation circuit 14 applies the H to the first terminal Out3 of the first coil 50A and applies the L to the second terminal Out4 of the first coil 50A. The period of the drive pulse P1 is approximately 0.75 ms.

As a result of applying the drive pulse P1, the rotor 30 starts to rotate in the negative direction. When the stable stationary position of the drive pulse of −225 degrees is exceeded depending on the drive voltage and load size, torque acts as a brake.

(Step S15) Subsequently, during the period from time t14 to t15, the drive pulse generation circuit 14 applies the 45-degree drive pulse to the stepping motor 3 as the drive pulse P2. That is, the drive pulse generation circuit 14 applies the H to the first terminal Out1 of the second coil 50B and applies the L to the second terminal Out2 of the second coil 50B. As indicated by the reference numerals g183 and g184, the drive pulse generation circuit 14 applies the L to the first terminal Out3 and the second terminal Out4 of the first coil 50A. The period of the drive pulse P2 is approximately 2.25 ms.

As a result of applying the drive pulse P2, the rotor 30 continues to rotate in the negative direction and rotates by −90 degrees or more.

(Step S16) Subsequently, during the period of time t15 to t16, similarly to the period of time 0 to t11, the drive pulse generation circuit 14 applies the 315-degree drive pulse to the stepping motor 3 as the drive pulse P1. Similarly to the period from time 0 to t11, the drive pulse generation circuit 14 applies the L to the first terminal Out3 of the first coil 50A and applies the H to the second terminal Out4 of the first coil 50A.

As a result of applying the drive pulse P1, the rotor 30 starts to rotate in the negative direction. When the stable stationary position of the drive pulse of the −45 degrees is exceeded depending on the drive voltage and load size, torque acts as a brake.

(Step S17) Subsequently, during the period from time t16 to t17, similarly to the period from time t11 to t12, the drive pulse generation circuit 14 applies the 225-degree drive pulse to the stepping motor 3 as the drive pulse P2. Similarly to the period from time t11 to t12, the drive pulse generation circuit 14 applies the L to the first terminal Out3 and the second terminal Out4 of the first coil 50A.

As a result of applying the drive pulse P2, the rotor 30 continues to rotate in the negative direction and rotates by −90 degrees or more.

(Step S18) Subsequently, during the period from time t17 to t18, similarly to the period from time t13 to t14, the drive pulse generation circuit 14 applies the 135-degree drive pulse to the stepping motor 3 as the drive pulse P1. Similarly to the period from time t13 to time t14, the drive pulse generation circuit 14 applies the H to the first terminal Out3 of the first coil 50A and applies the L to the second terminal Out4 of the first coil 50A.

As a result of applying the drive pulse P1, the rotor 30 starts to rotate in the negative direction. When the stable stationary position of the 225-degree drive pulse is exceeded depending on the drive voltage and load size, torque acts as a brake.

(Step S19) Subsequently, during the period from time t18 to t19, similarly to the period from time t14 to t15, the drive pulse generation circuit 14 applies the 45-degree drive pulse to the stepping motor 3 as the drive pulse P2. Similarly to the period from time t14 to t15, the drive pulse generation circuit 14 applies the L to the first terminal Out3 and the second terminal Out4 of the first coil 50A.

As a result of applying the drive pulse P2, the rotor 30 continues to rotate in the negative direction and rotates by −90 degrees or more.

After time t19, a drive pulse similar to the drive pulse applied to the stepping motor 3 is repeatedly applied to the stepping motor 3 during the period from time t15 to t19. As the waveform of the drive pulse, a waveform similar to the waveform in the period from time t15 to t19 is repeated.

As such, the analog electronic timepiece 1 first executes a first reverse rotation initialization process in the fast-forwarding reverse rotation hand movement mode. The first reverse rotation initialization process is a process for setting the state of the stepping motor 3 to the initial stepping motor state in the fast-forwarding reverse rotation hand movement mode. Specifically, the first reverse rotation initialization process is a process in which drive pulses are sequentially applied to the stepping motor 3 in the order of the 315-degree drive pulse P1 and the 225-degree drive pulse P2, and then a waiting period is generated.

Next, the analog electronic timepiece 1 repeatedly executes a first reverse rotation process. The first reverse rotation process is a process in which drive pulses are successively applied to the stepping motor 3 in the order of the 135-degree drive pulse P1, the 45-degree drive pulse P2, the 315-degree drive pulse P1, and the 225-degree drive pulse P2.

The analog electronic timepiece 1 returns the rotor 30 from the stepped-out state to a state in which the rotor 30 returns to the original rotation angle by the first reverse rotation initialization process in the fast-forwarding reverse rotation hand movement mode. As such, the analog electronic timepiece 1 makes the polarity of the rotor 30 and the polarity of the drive pulse coincident with each other even in the fast-forwarding reverse rotation hand movement mode.

Modification Example of First Embodiment

In the example described above, the example in which the drive pulse P1 is a 45-degree drive pulse and the drive pulse P2 is a 135-degree drive pulse is described, but is not limited to thereto. A combination in which the drive pulse P1 is the 90-degree drive pulse and the drive pulse is the 135-degree drive pulse P2 may be adopted.

Here, as described above, the 90-degree drive pulse is a drive pulse by which the H is applied to the first terminal Out1 of the second coil 50B, the L is applied to the second terminal Out2 of the second coil 50B, the H is applied to the first terminal Out3 of the first coil 50A, and the L is applied to the second terminal Out4 of the first coil 50A.

A drive pulse in the fast-forwarding forward rotation hand movement mode in the combination in which the drive pulse P1 is the 90-degree drive pulse and the drive pulse P2 is the 135-degree drive pulse will be described.

(Step S21) First, the drive pulse generation circuit 14 applies the drive pulse P1 of 90 degrees to the stepping motor 3. With this configuration, a magnetic field is generated as indicated by the reference numeral g103 in FIG. 3, and the rotor 30 starts to rotate in the positive direction from the reference position (0 degree). When the stable stationary position of the 90-degree drive pulse is exceeded depending on the drive voltage and load size, torque acts as a brake.

(Step S22) Subsequently, the drive pulse generation circuit 14 applies the drive pulse P2 of 135 degrees to the stepping motor 3. With this configuration, a magnetic field is generated as indicated by the reference numeral g104 in FIG. 3, and the rotor 30 continues to rotate in the positive direction and rotates 90 degrees or more.

(Step S23) Subsequently, the drive pulse generation circuit 14 does not apply a drive pulse only during a waiting period which is a predetermined period. During the waiting period, the rotor 30 rotates by inertia from a rotation position of 135 degrees to 180 degrees of the second stop position, which is a stable stop position, and stops at a stable stationary position in a non-excited state.

(Step S24) Subsequently, the drive pulse generation circuit 14 applies the drive pulse P1 of 270 degrees to the stepping motor 3. With this configuration, a magnetic field is generated as indicated by the reference numeral g108 in FIG. 4, and the rotor 30 starts to rotate in the positive direction. When the stable stationary position of the 270-degree drive pulse is exceeded depending on the drive voltage and load size, torque acts as a brake.

(Step S25) Subsequently, the drive pulse generation circuit 14 applies the drive pulse P2 of 315 degrees to the stepping motor 3. With this configuration, a magnetic field is generated as indicated by the reference numeral g109 in FIG. 4, and the rotor 30 continues to rotate in the positive direction and rotates 90 degrees or more.

As described above, in the modification example, the drive pulse generation circuit 14 in the fast-forwarding forward rotation hand movement mode applies the drive pulses successively in the order of the drive pulse P1 of 90 degrees and the drive pulse P2 of 135 degrees and then generates a waiting period as a process of setting the state of the stepping motor 3 to the initial state of the stepping motor.

The waveforms of the drive pulse in the modification example differ from the waveform of FIG. 9 in that the g171 in FIG. 9 represents the drive pulse P1 of 90 degrees and the g173 in FIG. 9 represents the drive pulse P1 of 270 degrees, but the other waveforms are the same as in FIG. 9.

In the modification example, the drive pulse generation circuit 14 in the fast-forwarding reverse rotation hand movement applies the drive pulse in the order of the drive pulse P1 of 315 degrees and the drive pulse P2 of 270 degrees as a process of setting the state of the stepping motor 3 to the initial state of the stepping motor, and then generates a waiting period.

As such, in the modification example, the drive pulse generation circuit 14 first applies the drive pulse P1, which is a first pulse having a stable stationary position at 90 degrees or less after being rotated 90 degrees from the reference position (0 degree), to the stepping motor 3 in the fast-forwarding forward rotation hand movement mode, as a process of setting the state of the stepping motor 3 to the stepping motor initial state. In the modification example, the drive pulse generation circuit 14 applies the drive pulse P2, which is a second pulse having a stable stationary position at 90 degrees or less after being rotated 135 degrees from the reference position (0 degree), to the stepping motor 3 continuously to the drive pulse P1 in the fast-forwarding forward rotation hand movement mode. The drive pulse generation circuit 14 does not apply a drive pulse during a waiting period that is a predetermined period after first application of the drive pulse P2.

Summarization of First Embodiment

The analog electronic timepiece 1 according to the first embodiment configured as described above has a waiting period only once after the start of hand movement in the fast-forwarding hand movement mode and after application of two drive pulses. When the waiting period is passed, the state of the stepping motor 3 becomes the initial state of the stepping motor regardless of the state before the start of the fast-forwarding hand movement mode. For that reason, the analog electronic timepiece 1 of the first embodiment configured as described above can suppress the occurrence of the reversal operation caused by fast-forwarding the pointer. Since the analog electronic timepiece 1 configured as described above has a single waiting period, the analog electronic timepiece 1 can speed up the hand movement.

According to recent research, the reversal operation occurs by fast-forwarding in a state that is not the initial state of the stepping motor, that is, in a reverse polarity state (a state where the polarities of the rotor and the pulse do not coincide with each other). For example, when the rotor falls out during fast-forwarding, steps out due to the impact, and enters the reverse polarity state, the reversal operation occurs. When the user cannot determine the magnetic pole of the rotor due to a system failure such as a drop in power supply voltage, if fast-forwarding is performed after the system is restored, the rotor enters the reverse polarity state with a probability of 50% and the reverse operation occurs. When the rotor falls out during fast-forwarding and the reversal operation occurs, the user can detect an abnormality that causes the reversal operation, and thus does not feel stress. On the other hand, when the reversal operation occurs due to a system failure, the user cannot detect the abnormality that causes the reversal operation, and stress increases. For that reason, the analog electronic timepiece 1 can avoid the reversal operation and suppress an increase in stress by providing the analog electronic timepiece 1 with a mechanism that ensures the initial state of the stepping motor by providing a waiting time at the start of hand movement. Furthermore, in the analog electronic timepiece 1 of the first embodiment, since the speed of hand movement such as time adjustment can be increased, the period during which the user cannot know the time using the analog electronic timepiece 1 can be reduced. Therefore, the analog electronic timepiece 1 according to the first embodiment can suppress an increase in user's stress in terms of speeding up the hand movement.

In the first embodiment, the application time (for example, 2.25 ms) of the drive pulse P2 is longer than the application time (for example, 0.75 ms) of the drive pulse P1. In the first embodiment, the waiting period is 0.5 ms or more. The waiting period is approximately 0.5 ms to 2 ms because it is necessary to secure a time for the rotor 30 to return during reverse polarity.

The drive frequency is 200 Hz in a period in which the drive pulse application time is 3 ms and the waiting period is 2 ms. The drive frequency is a frequency at which the stepping motor 3 rotates. The application time of drive pulse is 3 ms, and the drive frequency during the waiting period of 0 ms is 333 Hz. Accordingly, the shorter the waiting period, the higher the drive frequency.

Second Embodiment

In the second embodiment, an example will be described in which the drive pulse P1 of 90 degrees and the drive pulse P2 of 180 degrees are used as one unit process.

Figure 14:
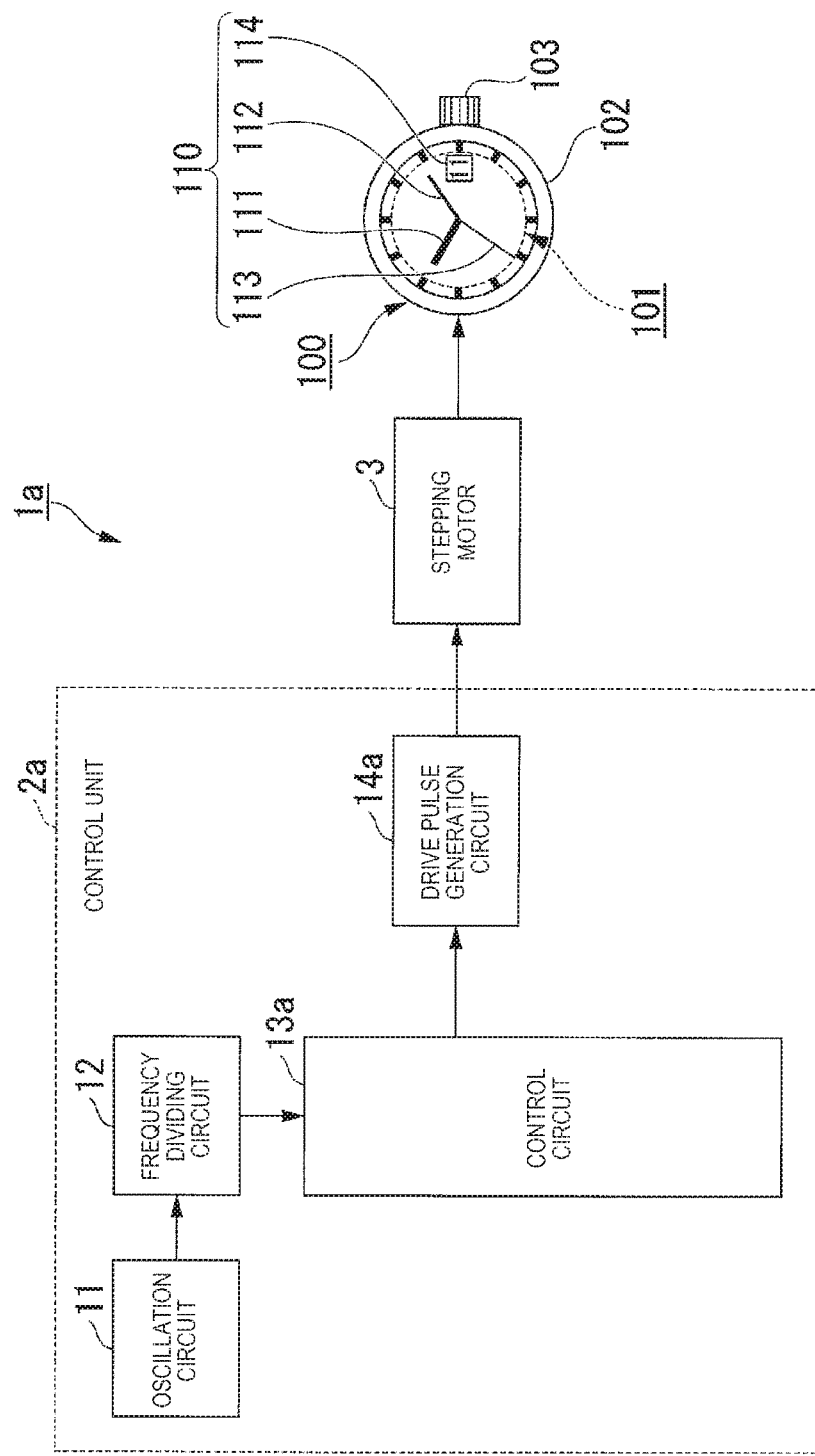
FIG. 14 is a block diagram illustrating an example of a functional configuration of an analog electronic timepiece according to a second embodiment.

FIG. 14 is a block diagram illustrating an example of a functional configuration of the analog electronic timepiece 1a according to a second embodiment.

The analog electronic timepiece 1a according to the second embodiment differs from the analog electronic timepiece 1 according to the first embodiment in that a control unit 2a is provided instead of the control unit 2. The control unit 2a differs from the control unit 2 in that a control circuit 13a is provided instead of the control circuit 13, and a drive pulse generation circuit 14a is provided instead of the drive pulse generation circuit 14.

Hereinafter, components having the same functions as the functional units included in the analog electronic timepiece 1 are denoted by the same reference numerals as those in FIG. 1.

The control circuit 13a controls each electronic circuit element constituting the analog electronic timepiece 1a and controls a pulse signal for motor rotation drive.

When the control circuit 13a obtains an operation signal indicating the fast-forwarding forward rotation hand movement mode, the control circuit 13a transmits a control signal to the drive pulse generation circuit 14a so that the analog electronic timepiece 1a is driven in the fast-forwarding forward rotation hand movement mode. When the control circuit 13a acquires the operation signal indicating the fast-forwarding reverse rotation hand movement mode, the control circuit 13a transmits a control signal to the drive pulse generation circuit 14a so that the analog electronic timepiece 1a is driven in the fast-forwarding reverse rotation hand movement mode.

The drive pulse generation circuit 14a generates the drive pulse for motor rotation drive based on the control signal output from the control circuit 13a, and outputs the generated drive pulse to the stepping motor 3.

Figure 15:
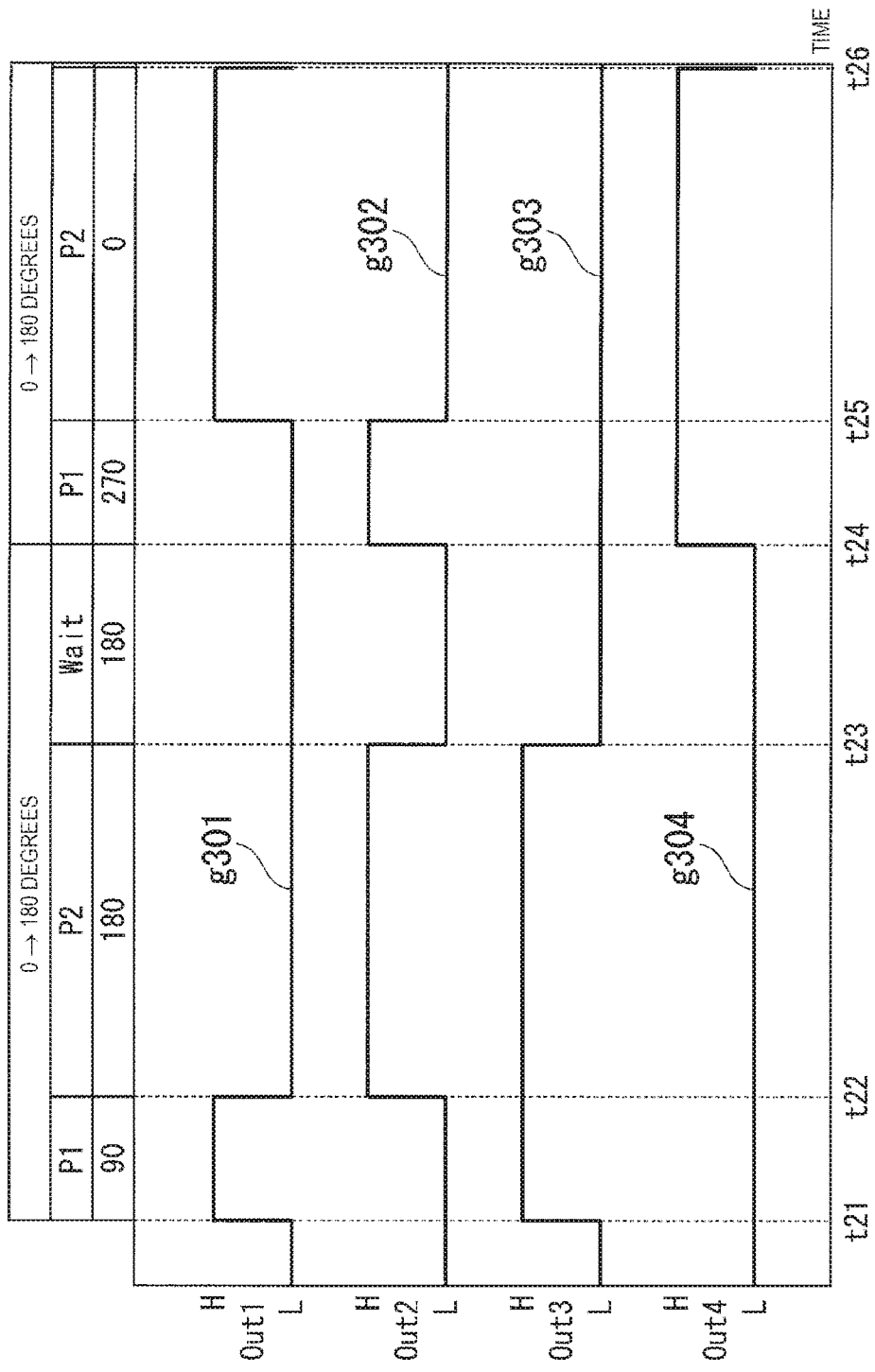
FIG. 15 is a diagram illustrating an example of a waveform of a drive pulse in a fast-forwarding forward rotation hand movement mode in the second embodiment.

FIG. 15 is a diagram illustrating an example of a waveform of the drive pulse in the fast-forwarding forward rotation hand movement mode in the second embodiment. Reference numeral g301 is a drive pulse applied to the first terminal Out1 of the second coil 50B by the drive pulse generation circuit 14a. Reference numeral g302 indicates a drive pulse applied to the second terminal Out2 of the second coil 50B by the drive pulse generation circuit 14a. Reference numeral g303 indicates a drive pulse applied to the first terminal Out3 of the first coil 50A by the drive pulse generation circuit 14a. Reference numeral g304 indicates a drive pulse applied to the second terminal Out4 of the first coil 50A by the drive pulse generation circuit 14a.

(Step S31) As illustrated in FIG. 15, during the period from time t21 to t22, the drive pulse generation circuit 14a applies the drive pulse P1 of 90 degrees to the stepping motor 3. That is, the drive pulse generation circuit 14a applies the H to the first terminal Out1 of the second coil 50B, applies the L to the second terminal Out2 of the second coil 50B, applies the H to the first terminal Out3 of the first coil 50A, and applies the L to the second terminal Out4 of the first coil 50A.

By applying the drive pulse P1 of 90 degrees, a magnetic field is generated as indicated by the reference numeral g103 in FIG. 3, and the rotor 30 starts to rotate in the positive direction. When a stable stationary position of the 90-degree drive pulse is exceeded depending on the drive voltage and load magnitude, torque acts as a brake.

(Step S32) Subsequently, during the period of time t22 to t23, the drive pulse generation circuit 14a applies the drive pulse P2 of 180 degrees to the stepping motor 3. That is, the drive pulse generation circuit 14a applies the L to the first terminal Out1 of the second coil 50B, applies the H to the second terminal Out2 of the second coil 50B, applies the H to the first terminal Out3 of the first coil 50A, and applies the L to the second terminal Out4 of the first coil 50A.

By applying the drive pulse of 180 degrees, a magnetic field is generated as indicated by the reference numeral g105 in FIG. 3, and the rotor 30 continues to rotate in the positive direction and rotates 90 degrees or more.

(Step S33) Subsequently, during a period from time t23 to t24, the drive pulse generation circuit 14 is set in a waiting period.

As a result, the rotor 30 stops at the second stop position at an angle of 180 degrees in the positive direction.

(Step S34) Subsequently, during the period from time t24 to t25, the drive pulse generation circuit 14a applies the 270-degree drive pulse to the stepping motor 3. That is, the drive pulse generation circuit 14a applies the L to the first terminal Out1 of the second coil 50B, applies the H to the second terminal Out2 of the second coil 50B, applies the L to the first terminal Out3 of the first coil 50A, and applies the H to the second terminal Out4 of the first coil 50A.

By applying the 270-degree drive pulse, a magnetic field is generated as indicated by the reference numeral g108 in FIG. 4, and the rotor 30 starts to rotate in the positive direction. When the stable stationary position of the 270-degree drive pulse is exceeded depending on the drive voltage and load size, torque acts as a brake.

(Step S35) Subsequently, during the period from time t25 to t26, the drive pulse generation circuit 14a applies a 0-degree drive pulse to the stepping motor 3. That is, the drive pulse generation circuit 14a applies the H to the first terminal Out1 of the second coil 50B, applies the L to the second terminal Out2 of the second coil 50B, applies the L to the first terminal Out3 of the first coil 50A, and applies the H to the second terminal Out4 of the first coil 50A.

By applying the drive pulse of 0 degree, a magnetic field is generated as indicated by the reference numeral g110 in FIG. 4, and the rotor 30 continues to rotate in the positive direction and rotates 90 degrees or more.

(Step S36) After t26, steps S31, S32, S34, and S35 are repeatedly executed.

As such, in the second embodiment, the drive pulse generation circuit 14a first executes a second forward rotation initialization process in the fast-forwarding forward rotation hand movement mode. The second forward rotation initialization process is a process of setting the state of the stepping motor 3 to the initial state of the stepping motor in the fast-forwarding forward rotation hand movement mode. Specifically, the second forward rotation initialization process is a process in which drive pulses are continuously applied to the stepping motor 3 in the order of the drive pulse P1 of 90 degrees and the drive pulse P2 of 180 degrees, and then a waiting period is generated. Next, the drive pulse generation circuit 14a repeatedly executes a second forward rotation process. The second forward rotation process is a process in which drive pulses are continuously applied to the stepping motor 3 in the order of the drive pulse P1 of 270 degrees, the drive pulse P2 of 0 degree, the drive pulse P1 of 90 degrees, and the drive pulse P2 of 180 degrees.

The application time (energy) of the drive pulse P2 is longer than the application time (energy) of the drive pulse P1.

As such, the drive pulse P1 in the second embodiment is a drive pulse that rotates 90 degrees from the reference position (0 degree) and has a stable stationary position at 90 degrees or less. The drive pulse P2 in the second embodiment is a drive pulse that rotates 180 degrees from the reference position (0 degree) and has a stable stationary position at 90 degrees or more.

The analog electronic timepiece 1a returns the rotor 30 from the stepped-out state to a state in which the rotor 30 returns to the original rotation angle by the second forward rotation initialization process in the fast-forwarding forward rotation hand movement mode. In this way, in the second embodiment, the analog electronic timepiece 1a makes the polarity of the rotor and the polarity of the drive pulse coincident with each other even in the fast-forwarding forward rotation hand movement mode.

Modification of Second Embodiment

In the example described above, the example in which the drive pulse P1 is 90 degrees in the fast-forwarding forward rotation hand movement mode is described, but the drive pulse P1 may be a pulse of 45 degrees.

When the drive pulse P1 is the pulse of 45 degrees, the drive pulse generation circuit 14a may apply the drive pulse P1 of 45 degrees to the stepping motor 3, then apply the drive pulse P2 of 180 degrees in the fast-forwarding forward rotation hand movement mode, and then, after a waiting period, apply the drive pulse P1 of 225 degrees and then apply the drive pulse P2 of 0 degree.

The drive pulse generation circuit 14a in the fast-forwarding reverse rotation hand movement mode may apply the drive pulse P1 of 0 degree to the stepping motor 3, then apply the drive pulse P2 of 225 degrees, and then, after a waiting period, apply the drive pulse P1 of 180 degrees, and then apply the drive pulse P2 of 45 degrees.

As such, in the modification example, in the fast-forwarding forward rotation hand movement mode, the drive pulse generation circuit 14a first applies the drive pulse P1, which is the first pulse having a stable stationary position at 90 degrees or less after being rotated 45 degrees from the reference position (0 degree), to the stepping motor 3. In the modification example, the drive pulse generation circuit 14a applies the drive pulse P2, which is a second pulse having a stable stationary position at 90 degrees or more after being rotated 180 degrees from the reference position (0 degree), to the stepping motor 3 continuously to the drive pulse P1. The drive pulse generation circuit 14a does not apply the drive pulse during the waiting period after the first application of the drive pulse P2.

In the fast-forwarding reverse rotation hand movement mode, the drive pulse generation circuit 14a first applies a drive pulse to the stepping motor 3 in the order of the drive pulse P1 of 0 degree and the drive pulse P2 of 270 degrees, and then generates a waiting period. The drive pulse generation circuit 14a applies, after a waiting period, the drive pulses in the order of the drive pulse P1 of 180 degrees, the drive pulse P2 of 90 degrees, the drive pulse P1 of 0 degree, and the drive pulse P2 of 270 degrees. After the application, without passing through the waiting period, the drive pulse generation circuit 14a repeatedly applies, after the waiting period, the drive pulses in the order of the drive pulse P1 of 180 degrees, the drive pulse P2 of 90 degrees, the drive pulse P1 of 0 degree, and the drive pulse P2 of 270 degrees.

The analog electronic timepiece 1a according to the second embodiment returns the rotor 30 from the stepped-out state to a state in which the rotor 30 returns to the original rotation angle by a second reverse rotation initialization process in the fast-forwarding reverse rotation hand movement mode. The second reverse rotation initialization process is a process for setting the state of the stepping motor 3 to the initial state of the stepping motor in the fast-forwarding reverse rotation hand movement mode. Specifically, in the second reverse rotation initialization process, the drive pulse is continuously applied in the order of the drive pulse P1 of 0 degree and the drive pulse P2 of 270 degrees, and then a waiting period is generated. In this way, in the second embodiment, the analog electronic timepiece 1a makes the polarity of the rotor and the polarity of the drive pulse coincident with each other even in the fast-forwarding reverse rotation hand movement mode.

Summarization of Second Embodiment

The analog electronic timepiece 1a configured as described above has a waiting period only once after the start of the hand movement in the fast-forwarding hand movement mode and after the application of two drive pulses. When the waiting period is passed, the state of the stepping motor 3 becomes the initial state of the stepping motor regardless of the state before the start of the fast-forwarding hand movement mode. For that reason, the analog electronic timepiece 1a of the second embodiment configured as described above can suppress the occurrence of the reversal operation caused by fast-forwarding the pointer. Since the analog electronic timepiece 1a configured as described above has a single waiting period, the analog electronic timepiece 1 can speed up the hand movement.

Also, in the second embodiment, the waiting period is 0.5 ms or more, for example, 0.5 to 2 ms.

Third Embodiment

In the third embodiment, an example will be described in which the first drive pulse P1 of 45 degrees, the second drive pulse P1 of 90 degrees, the first drive pulse P2 of 180 degrees, and the drive pulse P2 of 180 degrees are used as one unit process.

Figure 16:
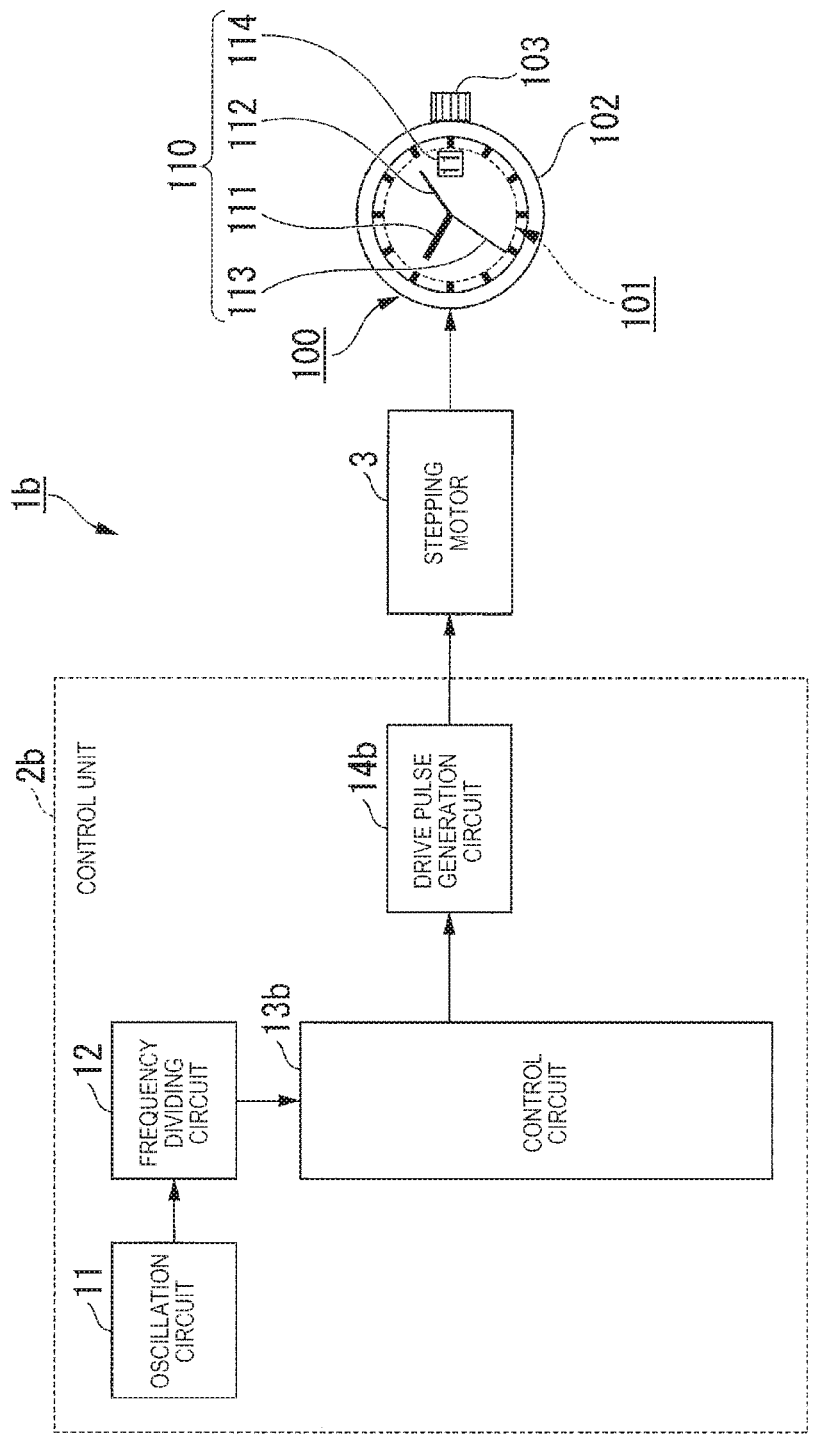
FIG. 16 is a block diagram illustrating an example of a functional configuration of an analog electronic timepiece according to a third embodiment.

FIG. 16 is a block diagram illustrating an example of a functional configuration of an analog electronic timepiece 1b according to a third embodiment.

The analog electronic timepiece 1b according to the third embodiment differs from the analog electronic timepiece 1 according to the first embodiment in that a control unit 2b is provided instead of the control unit 2. The control unit 2b differs from the control unit 2 in that a control circuit 13b is provided instead of the control circuit 13 and a drive pulse generation circuit 14b is provided instead of the drive pulse generation circuit 14.

Hereinafter, components having the same functions as the functional units included in the analog electronic timepiece 1 are denoted by the same reference numerals as those in FIG. 1.

The control circuit 13b controls each electronic circuit element constituting the analog electronic timepiece 1b and controls a pulse signal for motor rotation drive.

When the control circuit 13b obtains the operation signal indicating the fast-forwarding forward rotation hand movement mode, the control circuit 13b transmits a control signal to the drive pulse generation circuit 14b so that the analog electronic timepiece 1b is driven in the fast-forwarding reverse rotation hand movement mode. When the control circuit 13b acquires the operation signal indicating the fast-forwarding reverse rotation hand movement mode, the control circuit 13b transmits a control signal to the drive pulse generation circuit 14b so that the analog electronic timepiece 1b is driven in the fast-forwarding reverse rotation hand movement mode.

The drive pulse generation circuit 14b generates a drive pulse for motor rotation drive based on the control signal output from the control circuit 13b, and outputs the generated drive pulse to the stepping motor 3.

Figure 17:
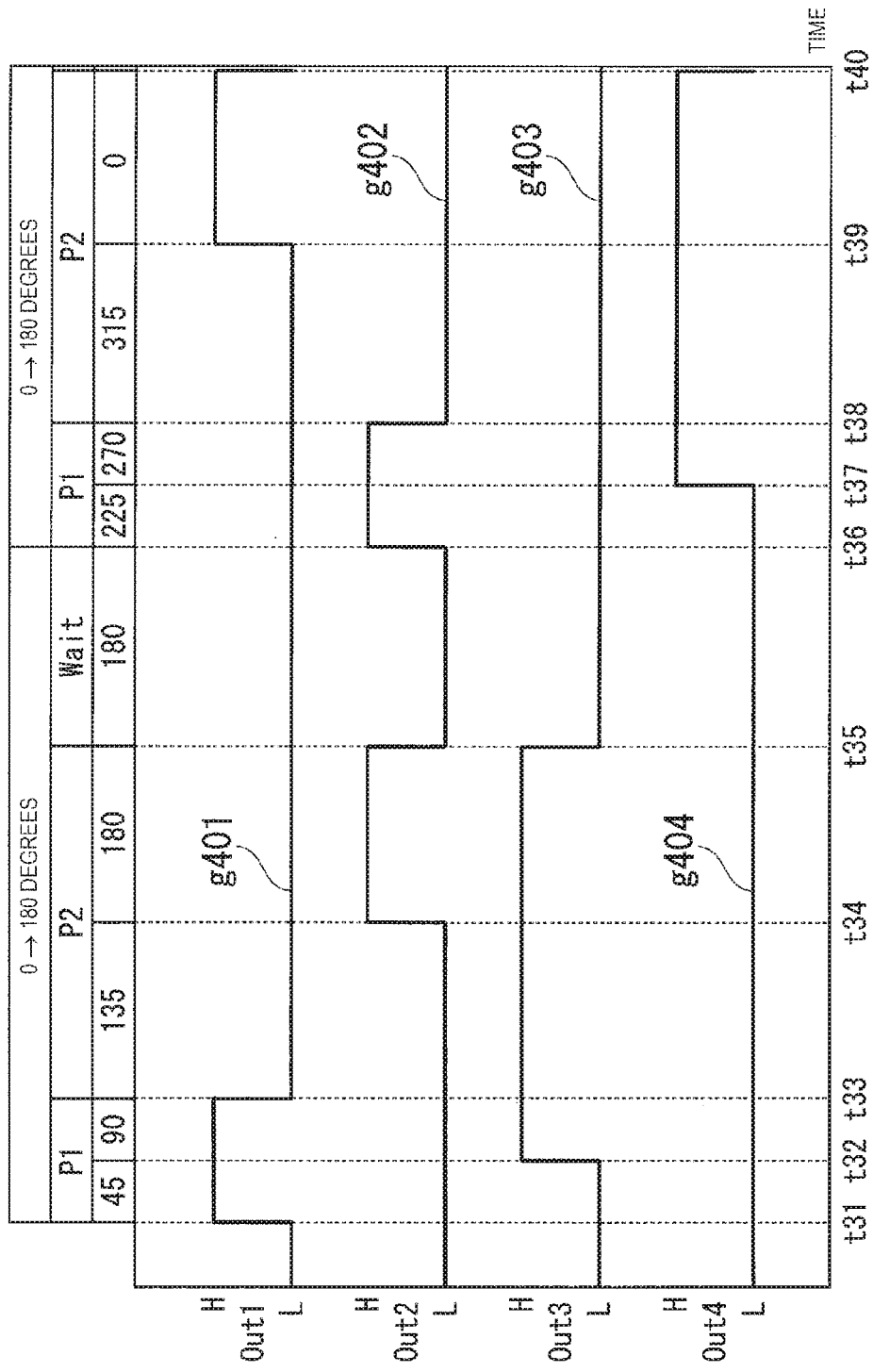
FIG. 17 is a diagram illustrating an example of a waveform of a drive pulse in a fast-forwarding forward rotation hand movement mode in the third embodiment.

FIG. 17 is a diagram illustrating an example of a waveform of a drive pulse in the fast-forwarding forward rotation hand movement mode in the third embodiment. Reference numeral g401 indicates a drive pulse applied to the first terminal Out1 of the second coil 50B by the drive pulse generation circuit 14b. Reference numeral g402 indicates a drive pulse applied to the second terminal Out2 of the second coil 50B by the drive pulse generation circuit 14b. Reference numeral g403 indicates a drive pulse applied to the first terminal Out3 of the first coil 50A by the drive pulse generation circuit 14b. Reference numeral g404 indicates a drive pulse applied to the second terminal Out4 of the first coil 50A by the drive pulse generation circuit 14b.

(Step S41) As illustrated in FIG. 17, during the period from time t31 to t32, the drive pulse generation circuit 14b applies a first drive pulse P1 of 45 degrees to the stepping motor 3. That is, the drive pulse generation circuit 14b applies the H to the first terminal Out1 of the second coil 50B, applies the L to the second terminal Out2 of the second coil 50B, and applies the L to the first terminal Out3 and the second terminal Out4 of the first coil 50A.

By applying the first drive pulse P1 of 45 degrees, a magnetic field is generated as indicated by the reference numeral g102 in FIG. 3, and the rotor 30 starts to rotate in the positive direction. When the stable stationary position (first angle) of the 45-degree drive pulse is exceeded depending on the drive voltage and load size, torque works as a brake.

(Step S42) Subsequently, during the period of time t32 to t33, the drive pulse generation circuit 14b applies a second drive pulse P1 of 90 degrees to the stepping motor 3. That is, the drive pulse generation circuit 14b applies the H to the first terminal Out1 of the second coil 50B, applies the L to the second terminal Out2 of the second coil 50B, applies the H to the first terminal Out3 of the first coil 50A, and applies the L to the second terminal Out4 of the first coil 50A.

By applying the second drive pulse P1 of 90 degrees, a magnetic field is generated as indicated by the reference numeral g103 in FIG. 3, and the rotor 30 starts to rotate in the positive direction. When the stable stationary position (second angle) of the 90-degree drive pulse is exceeded depending on the drive voltage and load, torque acts as a brake.

(Step S43) Subsequently, during the period from time t33 to t34, the drive pulse generation circuit 14b applies a first drive pulse P2 of 135 degrees to the stepping motor 3. That is, the drive pulse generation circuit 14b applies the L to the first terminal Out1 and the second terminal Out2 of the second coil 50B, applies the H to the first terminal Out3 of the first coil 50A, and applies the L to the second terminal Out4 of the first coil 50A.

By applying the first drive pulse P2 of 135 degrees, a magnetic field is generated as indicated by the reference numeral g104 in FIG. 3 and the rotor 30 continues to rotate in the positive direction and rotates 45 degrees (135 degrees (third angle)=90+45 degrees) or more.

(Step S44) Subsequently, during the period of time t35 to t36, the drive pulse generation circuit 14b applies a second drive pulse P2 of 180 degrees to the stepping motor 3. That is, the drive pulse generation circuit 14b applies the L to the first terminal Out1 of the second coil 50B, applies the H to the second terminal Out2 of the second coil 50B, applies the H to the first terminal Out3 of the first coil 50A, and applies the L to the second terminal Out4 of the first coil 50A.

By applying the drive pulse P1 of 180 degrees, a magnetic field is generated as indicated by the reference numeral g105 in FIG. 3, and the rotor 30 continues to rotate in the positive direction and rotates 45 degrees (180 degrees (fourth angle)=135+45 degrees) or more.

(Step S45) Subsequently, during the period from time t35 to t36, the drive pulse generation circuit 14b is set to the waiting period.

As a result, the rotor 30 stops at the stable stationary position in a non-excited state, which is the second stop position at an angle of 180 degrees.

(Step S46) Subsequently, during the period from time t36 to t37, the drive pulse generation circuit 14b applies a first drive pulse P1 of 225 degrees to the stepping motor 3. As a result, the rotor 30 starts to rotate in the positive direction. When the stable stationary position (first angle) of the 225-degree drive pulse is exceeded depending on the drive voltage and load size, torque acts as a brake.

(Step S47) Subsequently, during the period from time t37 to t38, the drive pulse generation circuit 14b applies a second drive pulse P1 of 270 degrees to the stepping motor 3. As a result, the rotor 30 starts to rotate in the positive direction. When the stable stationary position (second angle) of the 270-degree drive pulse is exceeded depending on the drive voltage and load size, torque acts as a brake.

(Step S48) Subsequently, during the period from time t38 to t39, the drive pulse generation circuit 14b applies a first drive pulse P2 of 315 degrees to the stepping motor 3. As a result, the rotor 30 continues to rotate in the positive direction and rotates 45 degrees (315 degrees (third angle)=270+45 degrees) or more.

(Step S49) Subsequently, during the period from time t39 to t40, the drive pulse generation circuit 14b applies a second drive pulse P2 of 0 degree. As a result, the rotor 30 continues to rotate in the positive direction and rotates 45 degrees (0 degree (fourth angle)=315+45 degrees) or more.

(Step S50) Subsequently, after t40, the processes of Step S41, Step S42, Step S43, Step S44, Step S46, Step S47, Step S48, and Step S49 are repeatedly executed.

As such, in the third embodiment, the drive pulse generation circuit 14b first executes a third forward rotation initialization process in the fast-forwarding forward rotation hand movement mode. The third forward rotation initialization process is a process of setting the state of the stepping motor 3 to the initial state of the stepping motor in the fast-forwarding forward rotation hand movement mode. Specifically, the third forward rotation initialization process is a process in which drive pulses are continuously applied to the stepping motor 3 in the order of the first drive pulse P1 of 45 degrees, the second drive pulse P1 of 90 degrees, the first drive pulse P2 of 135 degrees, and the second drive pulse P2 of 180 degrees, and then a waiting period is generated. Next, the drive pulse generation circuit 14b repeatedly executes a third forward rotation process. The third forward rotation process is a process in which drive pulses are continuously applied to the stepping motor 3 in the order of the first drive pulse P1 of 225 degrees, a second drive pulse P1 of 270 degrees, the first drive pulse P2 of 315 degrees, the second drive pulse P2 of 0 degree, the first drive pulse P1 of 45 degrees, the second drive pulse P1 of 90 degrees, the first drive pulse P2 of 135 degrees, and the second drive pulse P2 of 180 degrees.

As such, the first drive pulse P1 in the third embodiment is a drive pulse that rotates 45 degrees (first angle) from the reference position (0 degree) and has a stable stationary position at 90 degrees or less. As such, the second drive pulse P1 in the third embodiment is a drive pulse that rotates 90 degrees (second angle) from the reference position (0 degrees) and has a stable stationary position at 90 degrees or less. As such, the first drive pulse P2 in the third embodiment is a drive pulse that rotates 135 degrees (third angle) from the reference position (0 degree) and has a stable stationary position at 90 degrees or more. As such, the second drive pulse P2 in the third embodiment is a drive pulse that rotates 180 degrees (fourth angle) from the reference position (0 degree) and has a stable stationary position at 90 degrees or more.

The analog electronic timepiece 1b according to the third embodiment returns the rotor 30 from the stepped-out state to a state in which the rotor 30 returns to the original rotation angle by the third forward rotation initialization process in the fast-forwarding forward rotation hand movement mode. In this way, in the third embodiment, the analog electronic timepiece 1b makes the polarity of the rotor and the polarity of the drive pulse coincident with each other even in the fast-forwarding forward rotation hand movement mode.

The application time (energy) of the drive pulse P2 (first drive pulse P2 and second drive pulse P2) is longer than the application time (energy) of the drive pulse P1 (first drive pulse P1 and second drive pulse P1).

In the fast-forwarding reverse rotation hand movement mode, the drive pulse generation circuit 14b first applies drive pulses continuously in the order of the first drive pulse P1 of 0 degree, the second drive pulse P1 of 315 degrees, the first drive pulse P2 of 270 degrees, and the second drive pulse P2 of 225 degrees to the stepping motor 3, and then generates a waiting period. Next, the drive pulse generation circuit 14b applies drive pulses continuously in the order of the first drive pulse P1 of 180 degree, the second drive pulse P1 of 135 degrees, the first drive pulse P2 of 90 degrees, the second drive pulse P2 of 45 degrees, the first drive pulse P1 of 0 degree, the second drive pulse P1 of 315 degrees, the first drive pulse P2 of 270 degrees, and the second drive pulse P2 of 225 degrees to the stepping motor 3.

The analog electronic timepiece 1b according to the third embodiment returns the rotor 30 from the stepped-out state to a state in which the rotor 30 returns to the original rotation angle by the third reverse rotation initialization process in the fast-forwarding reverse rotation hand movement mode. The third reverse rotation initialization process is a process for setting the state of the stepping motor 3 to the initial state of the stepping motor in the fast-forwarding reverse rotation hand movement mode. Specifically, the third reverse rotation initialization process is a process in which the drive pulses are continuously applied in the order of the first drive pulse P1 of 0 degree, the second drive pulse P1 of 315 degrees, the first drive pulse P2 of 270 degrees, and the second drive pulse P2 of 225, and then a waiting period is generated. In this way, in the third embodiment, the analog electronic timepiece 1b makes the polarity of the rotor 30 and the polarity of the drive pulse coincident with each other even in the fast forward reverse hand movement mode.

Summarization of Third Embodiment

The analog electronic timepiece 1b configured as described above has a waiting period only once after the start of the hand movement in the fast-forwarding hand movement mode and after the application of four drive pulses. When the waiting period is passed, the state of the stepping motor 3 becomes the initial state of the stepping motor regardless of the state before the start of the fast-forwarding hand movement mode. For that reason, the analog electronic timepiece 1b of the third embodiment configured as described above can suppress the occurrence of the reversal operation caused by fast-forwarding the pointer. Since the analog electronic timepiece 1b configured as described above has a single waiting period, the analog electronic timepiece 1b can speed up the hand movement.

The waiting period is 0.5 ms or more, for example, 0.5 to 2 ms.

Modification Example

In the first to third embodiments, the drive pulse generation circuits 14, 14a, and 14b apply the drive pulses to the stepping motor 3 so that the waiting period is generated only once after the start of the fast-forwarding hand movement mode. However, the drive pulse generation circuits 14, 14a, and 14b may apply the drive pulse to the stepping motor 3 in any way as long as the drive pulses are applied to the stepping motor 3 so as to satisfy a drive pulse condition.

The drive pulse conditions are the following two conditions.

The first condition is that a waiting period is generated once in order to set the state of the stepping motor 3 to the initial state of the stepping motor at the start of the fast-forwarding hand movement mode. The start of the fast-forwarding hand movement mode is a period immediately after the drive pulse P1 and the drive pulse P2 are applied one by one after the fast-forwarding hand movement mode is started.

The second condition is that the stepping motor 3 rotates at least once at a predetermined timing (hereinafter referred to as "application timing") without passing through the waiting period, after the first waiting period. Specifically, the fact that the pointer makes one rotation without passing through the waiting period means that the pointer rotates once by continuously applying the driving pulse in the order of the driving pulse P1, the driving pulse P2, the driving pulse P1, and the driving pulse P2.

The application timing may be, for example, after each waiting period.

The drive pulse generation circuits 14, 14a, and 14b may apply a drive pulse to the stepping motor 3 so as to generate a waiting period, for example, every N unit processes. N is an integer of 2 or more.

For example, the drive pulse generation circuits 14, 14a and 14b may apply the drive pulse so as to rotate the stepping motor 3 one or more rotations without passing through the waiting period at least once in application timing, and apply the drive pulse so that the waiting period is randomly generated in a period other than the application timing.

As such, when the drive pulse generation circuits 14, 14a, and 14b apply the drive pulse to the stepping motor 3 so that the waiting period is generated twice or more, the occurrence of the reversal operation can be suppressed even after the first waiting period.

Here, by taking the drive pulse generation circuit 14 as an example, the drive pulse applied to the stepping motor 3 while the waiting period is generated every N unit processes of the modification example will be described with reference to FIG. 18.

Figure 18:
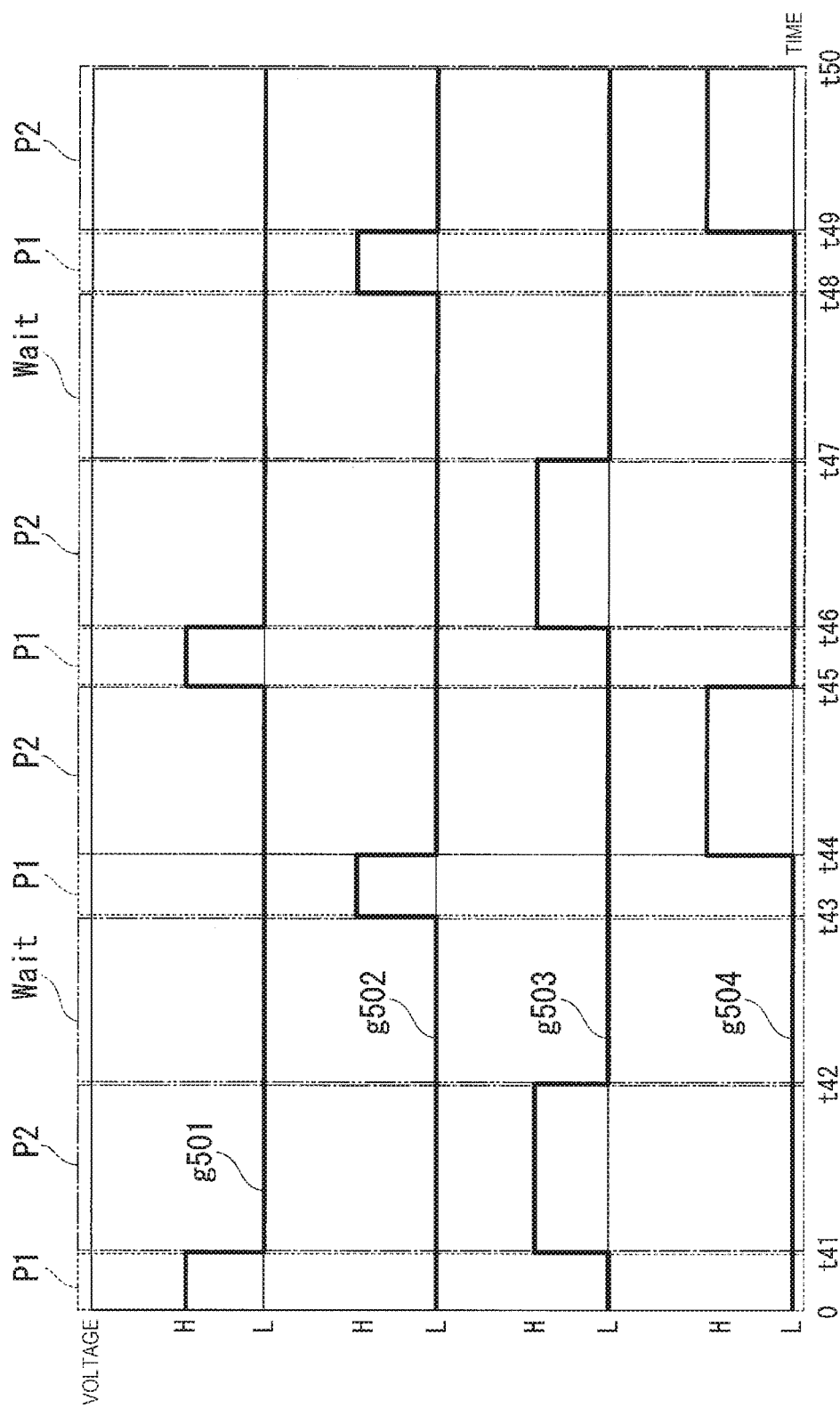
FIG. 18 is a diagram illustrating an example of a waveform of a drive pulse applied to a stepping motor in a modification example.

FIG. 18 is a diagram illustrating an example of a waveform of a drive pulse in the fast-forwarding forward rotation hand movement mode in the modification example. FIG. 18 illustrates an example of the waveform of the drive pulse applied to the stepping motor 3 by the drive pulse generation circuit 14.

In FIG. 18, the horizontal axis represents time, and the vertical axis represents voltage. Reference numeral g501 indicates a drive pulse applied to the first terminal Out1 of the second coil 50B by the drive pulse generation circuit 14. Reference numeral g502 indicates a drive pulse applied to the second terminal Out2 of the second coil 50B by the drive pulse generation circuit 14. Reference numeral g503 indicates a drive pulse applied to the first terminal Out3 of the first coil 50A by the drive pulse generation circuit 14. Reference numeral g504 indicates a drive pulse applied to the second terminal Out4 of the first coil 50A by the drive pulse generation circuit 14.

First, rotation from 0 to 180 degrees will be described.

(Step S1) The waveform in the period from time 0 to t43 is the same as the waveform in the period from time t0 to time t3 in FIG. 9.

Unlike FIG. 9, in FIG. 18, the drive pulse generation circuit 14 applies drive pulses to the stepping motor 3 in the order of the drive pulse P1 of 45 degrees, the drive pulse P2 of 135 degrees, the drive pulse P1 of 225 degrees, and the drive pulse P2 of 315 degrees, during the period from time t43 to t47. Unlike FIG. 9, in FIG. 18, a waiting period is generated from time t47 to time t48. After time t48, a drive pulse similar to the drive pulse applied to the stepping motor 3 is repeatedly applied to the stepping motor 3 during the period of time t43 to t48. The waveform of the drive pulse is the same as that during the period from time t43 to t48.

As such, FIG. 18 illustrates that a waiting period occurs once in order to set the state of the stepping motor 3 to the initial state of the stepping motor immediately after the start of the fast-forwarding forward rotation hand movement mode. FIG. 18 illustrates that the waiting period occurs every two unit processes after the waiting period occurs once.

In FIG. 18, when the total time during which the drive pulse P1 and the drive pulse P2 are applied is 3 ms and the waiting period is 2 ms, the drive frequency until the first waiting period is 200 Hz, and the drive frequency after the first waiting period is 250 Hz.

Figure 19:
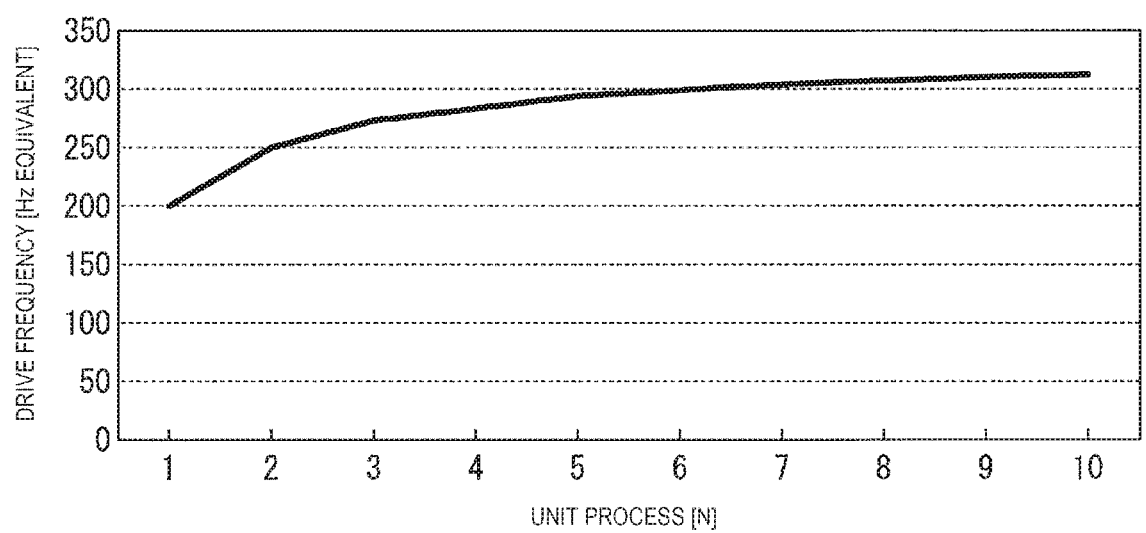
FIG. 19 is an explanatory graph illustrating a relationship between the number of occurrences of a waiting period and an operating frequency in the modification example.

FIG. 19 is an explanatory graph illustrating the relationship between the number of occurrences of the waiting period and the operating frequency in the modification example.

FIG. 19 illustrates the relationship between N and the drive frequency when the drive pulse generation circuit 14 applies a drive pulse to the stepping motor 3 so as to generate a waiting period every N unit processes. The horizontal axis in FIG. 19 represents the N. The vertical axis in FIG. 19 represents the drive frequency. FIG. 19 illustrates that the drive frequency increases as the frequency of occurrence of the waiting period increases (that is, as the N increases). FIG. 19 illustrates that the N is 10 or more and the drive frequency is asymptotic to 310 Hz.

The drive pulse P1 is an example of a first drive pulse. The drive pulse P2 is an example of a second drive pulse. The drive pulse generation circuit 14 is an example of a drive circuit. The control unit 2 is an example of a motor drive device. The first coil 50A and the second coil 50B are examples of driving coils. The analog electronic timepieces 1, 1a, and 1b are examples of timepieces.

The first to third embodiments described above may be combined and implemented. For example, forward rotation may be controlled by the method of the first embodiment, and reverse rotation may be controlled by the method of the second embodiment.

All or some of the processes performed by the control unit 2 may be performed by recording a program for realizing all or some of the functions of the control units 2, 2a, and 2b in the present disclosure on a computer-readable recording medium and causing a computer system to read and execute the program recorded on the recording medium. Here, the "computer system" includes an OS and hardware such as peripheral devices. The "computer system" includes a WWW system having a homepage providing environment (or display environment). The "computer-readable recording medium" refers to a portable medium such as a flexible disk, a magneto-optical disk, a ROM, and a CD-ROM, and a storage device such as a hard disk built in a computer system. Furthermore, the "computer-readable recording medium" includes a medium that holds a program for a certain period of time, such as a volatile memory (RAM) inside the computer that becomes a server or a client when a program is transmitted through a network such as the Internet or a communication channel such as a telephone line.

The program may be transmitted from a computer system storing the program in a storage device or the like to another computer system through a transmission medium or by a transmission wave in the transmission medium. Here, the "transmission medium" for transmitting the program refers to a medium having a function of transmitting information, such as a network (communication network) such as the Internet or a communication channel (communication line) such as a telephone line. The program may be a program for realizing some of the functions described above. Furthermore, the program may be a program that can realize the functions described above in combination with a program recorded in advance in a computer system, that is, a so-called difference file (difference program).

Although the form for implementing the present disclosure has been described above using the embodiments, the present disclosure is not limited to these embodiments, the present invention is not limited to these embodiments, and various modifications and substitutions can be made in a range without departing from the gist of the present invention.

What is claimed is:

1. A timepiece comprising:
a stepping motor in which a rotor magnetized in two poles is rotationally driven in a stator connected to a driving coil;
a drive circuit that applies a first drive pulse having a stable stationary position at a rotor rotation angle of 90 degrees or less from a reference position and a second drive pulse having the stable stationary position at a rotor rotation angle of 90 degrees or more from the reference position, as a drive pulse that is a pulse for driving the rotor, to the driving coil; and
a control circuit that controls application of the drive pulse by the drive circuit, wherein
when a period during which the drive pulse is not applied to the driving coil is assumed as a waiting period, the drive circuit generates the waiting period after a first application of the second drive pulse after an application of the drive pulse to the driving coil is started, and rotates the rotor by one or more turns without passing through the waiting period at at least one predetermined timing that is determined in advance after the waiting period.

2. The timepiece according to claim 1, wherein
when a process in which the drive circuit continuously applies the second drive pulse to the driving coil after the drive circuit applies the first drive pulse to the driving coil is assumed as one unit process, the drive circuit applies the drive pulse to the driving coil so as to generate the waiting period every N (N is an integer of 2 or more) unit processes.

3. The timepiece according to claim 1, wherein
the drive circuit applies the drive pulse to the driving coil so as to rotate the rotor by one or more turns without passing through the waiting period at at least one application timing and applies the drive pulse to the driving coil so that the waiting period is randomly generated in a period other than the application timing.

4. The timepiece according to claim 1, wherein
the waiting period is 0.5 ms or more and 2 ms or less.

5. A motor control method performed by a motor drive device, which includes a stepping motor in which a rotor magnetized in two poles is rotationally driven in a stator connected to a driving coil, a drive circuit that applies a first drive pulse having a stable stationary position at a rotor rotation angle of 90 degrees or less from a reference position and a second drive pulse having the stable stationary position at a rotor rotation angle of 90 degrees or more from the reference position, as a drive pulse that is a pulse for driving the rotor, to the driving coil, and a control circuit that controls application of the drive pulse by the drive circuit, the motor control method comprising:
a control step of, when a period during which the drive pulse is not applied to the driving coil is assumed as a waiting period, controlling the drive circuit to generate the waiting period after a first application of the second drive pulse after an application of the drive pulse to the driving coil is started and rotate the rotor by one or more turns without passing through the waiting period at at least one predetermined timing that is determined in advance after the waiting period.

* * * * *